US011140738B1

(12) United States Patent
Rane

(10) Patent No.: US 11,140,738 B1
(45) Date of Patent: Oct. 5, 2021

(54) NETWORK CONNECTIVITY ANALYZER AND DEVICE PEER-ASSISTING

(71) Applicant: Amazon Technologies, Inc., Seattle, WA (US)

(72) Inventor: Amit Kamlakar Rane, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 16/444,966

(22) Filed: Jun. 18, 2019

(51) Int. Cl.
| | |
|---|---|
| *H04W 56/00* | (2009.01) |
| *H04W 76/19* | (2018.01) |
| *H04B 17/318* | (2015.01) |
| *H04W 76/14* | (2018.01) |
| *H04W 4/80* | (2018.01) |

(52) U.S. Cl.
CPC .......... *H04W 76/19* (2018.02); *H04B 17/318* (2015.01); *H04W 4/80* (2018.02); *H04W 76/14* (2018.02)

(58) Field of Classification Search
CPC ....... H04W 76/19; H04W 76/14; H04W 4/80; H04B 17/318
USPC ......................................................... 370/329
See application file for complete search history.

(56) References Cited

U.S. PATENT DOCUMENTS

| | | | | |
|---|---|---|---|---|
| 2013/0287012 | A1* | 10/2013 | Pragada ................ | H04W 76/25 370/338 |
| 2015/0056987 | A1* | 2/2015 | Li ......................... | H04W 8/005 455/434 |
| 2016/0142897 | A1* | 5/2016 | Sorrentino ............ | H04W 8/005 370/329 |
| 2016/0212682 | A1* | 7/2016 | Chung .................. | H04W 76/14 |
| 2017/0142763 | A1* | 5/2017 | Bao ....................... | H04W 76/14 |
| 2018/0279202 | A1* | 9/2018 | Tenny ................... | H04W 76/14 |
| 2020/0187152 | A1* | 6/2020 | Karampatsis ......... | H04W 68/00 |

* cited by examiner

*Primary Examiner* — Sai Ming Chan
(74) *Attorney, Agent, or Firm* — Lee & Hayes, P.C.

(57) ABSTRACT

A system for monitoring and resolving issues associated with network connectivity. A first device may connect to an access point to communicatively couple with other computing devices on a network, such as a remote device. The first device and/or the remote device may monitor, in real-time, a health of network connection to provide one or more recommendations for resolving connectivity issues and/or instructing a second device to establish a connection with the first device. The connection may permit the first device to communicatively couple to the remote device via the second device.

20 Claims, 8 Drawing Sheets

NETWORK CONNECTIVITY ANALYZER AND DEVICE PEER-ASSISTING

BACKGROUND

Businesses and individuals rely on computing devices to communicate with one another and perform various tasks. With the widespread proliferation of these devices, network connectivity becomes increasingly important. In the event of a loss of connectivity, conventional mechanisms may lack techniques to reconnect computing devices. Additionally, conventional mechanisms may fail to timely diagnose a health of the network and/or take corrective actions. As a result, users may experience dropped connections, a loss of data, and/or perceived latency.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
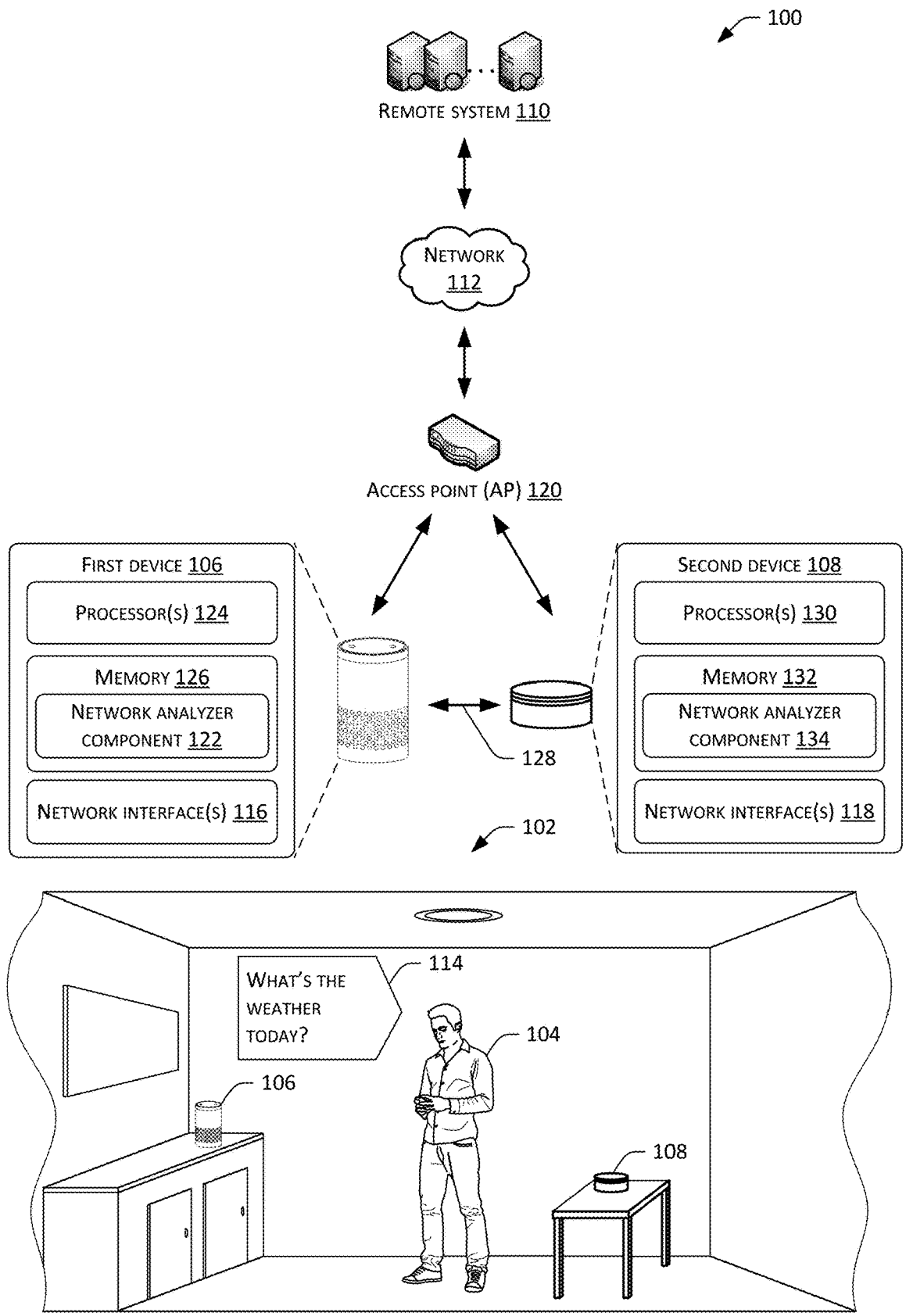
FIG. 1 illustrates an example environment showing a user interacting with one or more devices, according to an embodiment of the present disclosure. The one or more devices may communicatively couple to send and/or receive data.

Society depends on networks and computing devices to connect with one another. For example, people may rely on computing devices and networks to perform many of their daily tasks (e.g., web browsing, conferencing, emailing, streaming, etc.). With this reliance, disruptions in network connectivity or internet connections may have negative impacts. Despite the advancement of computing technology, conventional methods may not examine a health of the network in real-time to take corrective and/or preventative measures to ensure network connectivity.

This disclosure describes, in part, techniques for monitoring network connectivity, analyzing conditions associated with the network connectivity, and/or taking one or more corrective actions to troubleshoot issues associated with the network connectivity. In some instances, a device may connect to the network via a centralized access point (AP), such as a router, to communicatively couple with other computing devices on the network or a remote system. However, from time to time, the device's connectivity with the AP, the network, other computing devices, and/or the remote system may become impeded, interrupted, and/or terminated. For example, the device may lose connectivity while a user is actively engaging with the device. As a result, the user may experience a delay (e.g., latency) in transmitting and/or receiving data and/or may not be able to transmit and received data (in the case of a terminated connection). To avoid potential disruptions, the techniques disclosed herein may conduct an analysis on the connections between devices and recommend, or take, one or more corrective actions to resolve connectivity issues.

The device may comprise any type of device capable of or configured to communicate across a multitude of networks and communicatively couple with other devices on the network. In some instances, the device may include a mobile device (e.g., phone, tablet, laptop, speaker, voice-controlled assistant, home automation device, etc.) and/or other computing devices (e.g., desktop computer, printer, television, projector, thermostat, etc.). In some examples, the device may be a sophisticated voice-enabled device that includes components for processing voice commands, detecting the presence of one or more wake words within user speech, and may include network interfaces that configure the device to communicate over networks to send and receive data with various computing devices such as the remote system. In some instances, the device may include network interfaces that communicatively couple the device either directly, or indirectly, to one or more networks, such as Wi-Fi, Cellular, Bluetooth, Bluetooth Low Energy (BLE), near-field magnetic induction (NFMI), ZigBee, Z-wave, adaptive frequency technology (AFT), or the like. For example, the device may include a Wi-Fi interface that utilizes an AP of a home network to wirelessly connect the device to the internet. In some instances, the device may simultaneously include multiple communication channels or multiple connections with other devices.

The communication channels or connections between the device and the devices on the network may support various tasks. For example, the device may respond to user commands such as playing requested music, scheduling appointments, placing phone calls on behalf of the user, and the like. Accordingly, the connection between the device and the devices on the network may be crucial to perform certain tasks. For example, applications or components running on the device may rely on the network connectivity for updates, voice processing, and/or biometrics. Given this dependence, the device may include a network analyzer, or other component, that monitors the health of network connections and troubleshoots connectivity issues before users are interrupted or negatively impacted.

In some instances, the health of network connections may depend on several factors, such as the placement of the device relative to the AP, the Wi-Fi band or frequency band in use (e.g., 2.4 GHz, 5 GHz, etc.), the type of communication technology or protocol used by the AP and/or the device to communicate with other devices (e.g., Wi-Fi, Bluetooth, ZigBee, etc.), the existence of multiple communication channels between the device and other devices (e.g., Wi-Fi, Bluetooth, etc.), the number of devices sharing the same communication channel, frequency band, etc. For example, the existence of multiple devices using a channel to communicate with the AP may increase a signal-to-noise ratio (SNR), lead to congestion, latency, dropped or lost packets, and so forth. As these factors may affect a robustness of a connection with other devices on the network, the AP, and/or a strength of the connection, the network analyzer may monitor the connection and/or diagnose the health of the network (and/or the communication channels) for recommending and/or taking corrective actions to resolve or repair connections.

In some instances, the network analyzer may implicitly and/or continuously monitor the connections between the device, the network, the AP, and/or the remote system (e.g., according to a predetermined schedule). For example, the network analyzer may determine or receive an indication that a signal strength between the device, the AP, and/or the remote system is low, is experiencing dropped packets, or is terminated. Additionally, or alternatively, the network analyzer may explicitly monitor the connections upon being requested. For example, a user or operator of the device may explicitly request the status of the network connections (e.g., button press, voice command, etc.). In the event that the device loses connectivity with the network, the remote system, the connections fall below a threshold strength, and/or the connections fall below a threshold quality, the network analyzer may perform an analysis to troubleshoot connectivity issues and/or recommend or take one or more corrective actions. Such recommendations and/or corrective actions may repair the connection and/or cause the connection to satisfy the threshold strength or quality.

In some instances, the recommendations may include prompting the user to perform certain actions, such as moving the device closer to the AP, switching to a different communication channel with the AP, switching to a different communication band associated with the communication channel (e.g., 5 GHz, 2.4 GHz, etc.), resetting the AP, turning on/off the device, utilizing alternate communication protocols (e.g., Bluetooth, Wi-Fi, ZigBee, etc.), and so forth. In some instances, the prompts may be presented on a mobile device associated with the device. Additionally, or alternatively, the device may output audio associated with the recommendations and/or visual indications associated with recommendation (e.g., display). In some instances, the device may automatically perform the recommendations, without action by the user, based on the analysis by the network analyzer. In this sense, the recommendations may be proactively performed without notice or interaction from the user.

Additionally, or alternatively, in the event that the device detects connectivity issues, the device may reconfigure from an external mode to a software enabled access point mode, or soft AP mode, that enables the device to accept pairing or peer requests from other devices. In some instances, in the soft AP mode, the device may establish a connection with other devices for connecting to the network and/or the remote system. In other words, in the soft AP mode, the device may utilize other devices as APs for connecting to the network and/or the remote system.

For example, the device may utilize a network of computing devices, or machine-to-machine (M2M) communication capabilities, to maintain and/or establish connectivity with the remote system. In some instances, the device may utilize secondary device(s) within an environment in which the device and/or the AP resides (e.g., printer, desktop computer, smart television, voice-controlled device, etc.). In some instances, the device may pair with the secondary device(s), and in turn, the secondary device(s) may communicate with the network and/or the remote system on behalf of the device, via the AP. Accordingly, unless internet service provider (ISP) experiences a widespread outage, the loss of connectivity between the device and the remote system may be isolated, and the secondary device(s) may still be capable of communicating with the remote system via the AP.

For example, within an environment, the connection between the device, the AP, and/or the remote system may depend on the placement of the device relative to the AP, interference(s) from microwaves and other devices within the environment, obstructions within the environment (e.g., furniture, walls, etc.), and so forth. As such, despite the device experiencing connectivity issues with the AP, the secondary device(s) may be located elsewhere in the environment, may have a different type of connection with the remote system and/or the AP, and may not experience connectivity issues. In some instances, to reduce perceived latency, the device may perform the analysis on the connection (via the network analyzer) while simultaneously, or substantially simultaneously, configuring the device from an external mode to a soft AP mode to enable the device to connect to the one or more secondary device(s). In some instances, pairing the device and the secondary device(s) may include establishing one or more bi-directional communication channel(s) or connections (e.g., Bluetooth).

In some instances, the device may accept the pairing request from the secondary device(s) based on being in soft AP mode or based on determining that the device is experiencing poor connectivity or a failed connection with the remote system. That is, when the device is in soft AP mode, the device may accept instructions and/or requests from the secondary device(s) to establish the communication channel(s) or connections. For instance, if the device loses connectivity with the remote system and/or the AP, experiences a signal strength below the threshold strength, or the connection is below a threshold quality (e.g., SNR, congestion, etc.) the device may configure one or more components for receiving requests from the secondary device(s). In some instances, the device may terminate the connection with the AP and/or the remote system based on determining that the signal strength and/or channel quality is below a threshold and unable to support data transfer.

Upon establishing the communication channel(s), the secondary device(s) may act as an intermediary between the device and the network, thereby permitting the device to send data to and receive data with the remote system. In this sense, as the secondary device is communicatively coupled to the remote system, the secondary device may be designated as a master device, while the device that communicatively couples to the remote system via the secondary device (i.e., the device) may be designated as the client device. Additionally, upon establishing the communication channel or connection, the device may refrain from attempting to transmit data via the failed or poor connection with the remote system.

For example, and to briefly illustrate the transmission of data, the device may include one or more microphones that capture audio and generate audio data associated with a voice command of the user. The audio data corresponding to the voice command may be sent by the device to the secondary device, using the established communication channel or connection, and the secondary device may transmit the audio data to the remote system, via the AP, for speech processing using one or more previously communication channel(s). The remote system may analyze the audio data and determine an intent of the voice command (e.g., using language understanding (NLU) and/or natural language processing (NLP)). For example, the remote system may determine that the user requested the song "Isn't She Lovely" by Stevie Wonder to be played. The remote system may cause one or more actions to be performed, to respond to the voice command. For example, the remote system may transmit audio data associated with the requested song to the secondary device(s) and the secondary device(s) may transmit the audio data to the device via the established communication channel(s) or connection. Upon receiving the response (or audio data) from the secondary device(s), the device may play "Isn't She Lovely" by Stevie Wonder. Accordingly, using the connection between the device and the secondary device, the device and the secondary device may transmit and receive data, respectively, to carry out requests of the user.

In addition to, or alternative from the device including the network analyzer, the remote system may also include components that determine if, and when, the device is no longer connected to the network, the AP, the remote system, and/or experiences poor network connectivity. For example, the remote system may determine a signal strength associated with a connection between the device and the remote system and/or the AP, a packet loss associated with transmitting data with the device (whether between the remote system and the AP, or between the AP and the device), interferences, congestions, and so forth. In some instances, based on determining that the connection has been lost or is unable to support the transmission and receipt of data, the remote system may instruct the secondary device to communicate with the device for the purpose of establishing the communication channel(s). For example, the remote system may determine that the signal strength between the AP and the device is too low, is terminated, or that the connection is unable to support streaming of data without latency. In some instances, the remote system may select the secondary device for communicating with the device. Additionally, in some instances, the remote system may select a most suitable candidate among the secondary device(s). For example, the remote system may select a secondary device among the secondary device(s) based on a device election algorithm.

The device election algorithm may consider certain factors or criteria to determine the most suitable device. For example, in some instances, the factors may include determining a proximity of each of the secondary device(s) to the device, a signal strength of the each of the secondary device(s) with the remote system and/or the AP, a bandwidth of each of the secondary device(s) to communicate with the device, network interfaces or communication protocols of each of the secondary device(s), and/or a historical record of communication between each of the secondary device(s) and the device. Using these factors, and/or others, the device election algorithm may rank the secondary device(s) and select a secondary device. Once the secondary device is selected, the remote system may instruct the secondary device to communicate with the device to establish the communication channel(s).

In some instances, before, during, or after the device connects to the remote system via the secondary device, the device or the remote system may attempt to reestablish the failed or latent connection with the remote system or the device, respectively. For example, the network analyzer and/or the remote system may continuously monitor conditions associated with a connection (or lack thereof) between the device, the remote system, and/or the AP to determine whether the device is able to connect with the AP. For example, the device may monitor a signal strength or speed of a connection between device and the AP. During such monitoring, however, in some instances, the device may continue to transmit data and receive data from the secondary device. Additionally, such monitoring may be used to implement one or more recommendations for reestablishing or resolving the connection, such as switching communication frequency bands, communication protocols associated with the connection, etc. If the device and/or the remote system determines that the connection has been reestablished, has a signal strength greater than a threshold, and/or a channel quality greater than a threshold, the device or the remote system may repair or resolve the connection such that the device may communicate with the AP and in turn, the remote system. That is, the device and the remote system may utilize the once failed or latent connection upon the connection being repaired or otherwise resolved. In such instances, when the device and the remote system regain connectivity, the communication channel between the device and the secondary device may terminate and/or the device may switch from soft AP mode to the external mode. Instead, the device and the remote system may utilize the repair connection. Additionally, or alternatively, in some instances, the device may continue to utilize the secondary device to transmit data to the remote system (e.g., network bandwidth, etc.).

Thus, in light of the above, this application describes solutions for resolving issues associated with connecting devices on a network. Particularly, as devices rely on connectivity with other devices on the network, a weak, noisy, or lack of connectivity may result in a loss of internet. Monitoring the connectivity, may, in operation, serve to reduce user perceived latency. For example, the device and/or the remote system may monitor, in real-time, the health of the connections and provide one or more recommendations and/or may instruct secondary devices to establish communication channel(s) with the device. In some instances, the respective operations performed by the device, the secondary device, and/or the remote system may be performed simultaneously or in parallel to reduce user perceived latency. Accordingly, the techniques discussed herein may timely diagnose failures and/or interruptions for use in pinpointing connectivity issues and/or suggesting corrective actions.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein, and illustrated in the accompanying drawings, are non-limiting embodiments. The features illustrated or described in connection with one embodiment may be combined with the features of other embodiments, including as between systems and methods. Such modifications and variations are intended to be included within the scope of the disclosure and the appended claims.

FIG. 1 shows an illustrative computing architecture 100 set in an environment 102 that includes a user 104. The architecture 100 may include a first device 106 with which the user 104 may interact. In the illustrated implementation, the first device 106 is positioned on a counter within the environment 102. In other implementations, the first device 106 may be placed in any number of locations (e.g., ceiling, table, wall, beneath a table, under a chair, etc.). Further, the environment 102 may include more than device and/or the environment 102 may include other smart computing devices. For example, as shown in FIG. 1, the environment 102 may include a second device 108. Additionally, although FIG. 1 illustrates the first device 106 and the second device 108 residing within a same room of the environment 102, the first device 106 and the second device 108 may be located in separate rooms.

Generally, the first device 106 includes at least one microphone and at least one speaker to facilitate audio interactions with the user 104 and/or other users. The microphone may detect audio from the environment 102, such as commands uttered by the user 104. In some instances, the first device 106 may operate in conjunction with or may otherwise utilize a remote system 110 that is remote from the environment 102. For instance, the first device 106 may couple to the remote system 110 over a network 112. The network 112 may represent any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection protocols.

The first device 106 may include network interface(s) 116 for communicatively coupling to the network 112 and the remote system 110 via wired technologies, wireless technologies, or other connection protocols. In some instances, the first device 106 may upload data (e.g., audio data) to the remote system 110 for processing, given that the remote system 110 may have a computational capacity that far exceeds the computational capacity of the first device 106. The first device 106 may therefore utilize the remote system 110 for performing relatively complex analysis on audio captured within the environment 102.

For example, as shown in FIG. 1, the user 104 may issue a user command 114, such as "What's the weather today?" The first device 106, using the network interface(s) 116, may transmit audio data associated with the user command 114 to the remote system 110 via the network 112 and communication channels or connections. The remote system 110 may include components that determine an intent associated with the user command 114 and may transmit a response to the first device 106 for output. For example, the first device 106 may output a response, such as "Today's weather shows a high of 50 degrees, with a slight chance of rain," on one or more speakers. As such, in some instances, given the reliance on the remote system 110 for speech processing, the first device 106 (or components operating on the first device 106) may depend on a connectivity with the remote system 110 to process and/or respond to requests.

In some instances, the first device 106 may also include a light element (e.g., LED) that indicates a state of the first device 106 such as, for example, when power is on and/or when the first device 106 (or the remote system 110) is processing the user command 114.

The second device 108 may communicatively couple to the remote system 110 over the network 112 via one or more connections and may include network interface(s) 118. The second device 108 may perform similar operations as the first device 106, such as capturing and uploading data to the remote system 110 for speech processing.

In some instances, the first device 106 and/or the second device 108 may connect to the network 112 via an access point (AP) 120 (e.g., router, server computer, etc.). However, in some instances, the environment 102 may include multiple APs for connecting to the network 112. In some instances, the AP 120 may be located within the environment 102.

From time to time, the first device 106 (or the second device 108) may lose connectivity with the remote system 110, the network 112, and/or the AP 120 or a signal strength or channel quality between the first device 106, the remote system 110, and/or the AP 120 may fall below a threshold. For example, characteristics of the environment 102 may impact the connection between the first device 106, the remote system 110, and/or the AP 120, such as walls, doors, the presence of other devices, the location of the AP 120 within the environment (or additional access points), and so forth. Additionally, or alternatively, the connection may be affected by other devices communicatively coupled to the remote system 110, the network 112, and/or the AP 120 (e.g., bandwidth, congestion, SNR, etc.), other communication protocols utilized within the environment 102 (e.g., interferences), a communication channel and/or frequency band utilized by the first device 106 for connecting to the AP 120 (e.g., 2 GHz versus 5 GHz). As a result, based on these characteristics, within the environment 102, some devices may experience a strong connection with the AP 120, while other devices may experience a poor or slow connection with the AP 120 (e.g., dead zones). To monitor conditions associated with the connections, the first device 106 may include a network analyzer component 122 (or other module, application program interface (API), etc.). As illustrated in FIG. 1, the first device 106 may include processor(s) 124 and memory 126, which stores or otherwise has access to the network analyzer component 122.

In some instances, the network analyzer component 122 may analyze or otherwise assess one or more characteristics associated with a connection (or lack thereof) between the first device 106, the remote system 110, and/or the AP 120. For example, the network analyzer component 122 may determine a signal strength associated with a connection between the first device 106 and the AP 120 (e.g., received signal strength (RSS), received signal strength indicator (RSSI), milliwatts (mW), decibels (dBm), etc.), an amount of packets sent by the first device 106 but not successfully received by the remote system 110 (e.g., packet loss, packet error rate (PER), etc.), an amount of time it takes for packets sent by the first device 106 to be received by the remote system 110 (e.g., speed/ping test, etc.), and/or congestion (e.g., multiple devices utilizing a single communication channel, SNR, etc.).

In some instances, the network analyzer component 122 may determine characteristics associated with the connection either implicitly (e.g., automatically) and/or explicitly (e.g., when requested by the user 104). For example, as noted above, a strength of connection between the first device 106 and the AP 120 may depend on a physical proximity of the first device 106 relative to the AP 120 and/or other devices or communication technologies utilized within the environment 102. In some instances, these characteristics may impact a RSS of the connection between the first device 106 and the AP 120, a PER of packets sent by the first device 106 but not successfully received by the AP 120, a SNR between the first device 106 and the AP 120 (e.g., multiple devices communicating on a single communication channel), an environmental RSS associated with the environment 102 in which the first device 106 resides, and the like. While receiving and transmitting data with the network 112 and the remote system 110, the processor(s) 124 may determine, collect, and/or store in the memory 126, data associated with the health, strength, and/or quality of the connection. For example, the network analyzer component 122 may receive an indication from the network interface(s) 116 of the first device 106 corresponding to a signal strength of the connection between the first device 106, the remote system 110, and/or the AP 120. Additionally, to measure packet loss (or PER), the network analyzer component 122 may determine an amount of packets retransmitted by the first device 106 and/or failed responses (or acknowledgements) to packets sent by the first device 106 to the remote system 110. Moreover, the network analyzer component 122 may perform speed tests, or receive an indication of the time it takes to send and receive packets from the remote system 110. For example, the network analyzer component 122 may perform a ping test to determine the time it takes a packet of data to travel from the first device 106, to the remote system 110, and/or the AP 120 and then back to the first device 106. Such characteristics may measure the strength, quality, or health of the connection.

The network analyzer component 122 may also receive indications from other applications or APIs operating on the first device 106 to determine the health of the connection. For example, the network analyzer component 122 may receive an indication that an application on the first device 106 has stopped receiving data based on a poor connectivity, is buffering data, or is unable to successfully transmit data (e.g., packet loss, PER, etc.). In some instances, the network analyzer component 122 may utilize these indications to determine that the connectivity with the AP 120 (or the remote system 11) has failed or is below a threshold strength or quality. In some instances, the network analyzer component 122 may determine that the connection has failed based on the signal strength and/or the channel quality being lower than a threshold.

The network analyzer component 122 may monitor the connection between the first device 106, the remote system 110, and/or the AP 120 for providing recommendations and/or taking corrective actions. For example, if the network analyzer component 122 determines that the signal strength between the first device 106 and the AP 120 has terminated, the network analyzer component 122 may provide one or more recommendations to resolve the connection. In some instances, the recommendations may include prompting the user 104 to move the first device 106 closer to the AP 120, switching communication channel(s) and/or band(s) associated with the connection between the first device 106 and the AP 120, resetting the AP 120, etc. For example, a 2.4 GHz band may provide coverage over a larger area but may transmit data at slower speeds, while a 5.0 GHz band may provide cover over a lesser area but may transmit data at faster speeds. In some instances, the first device 106 may automatically take action and implement one or more of the recommendations, such as switching communication bands to resolve or repair the connection.

Additionally, or alternatively, upon experiencing connectivity issues with the remote system 110 and/or the AP 120, the first device 106 may configure the network interface(s) 116 (or additional components of the first device 106) to accept peer or pairing requests from additional computing devices, such as the second device 108. Here, the first device 106 may utilize the second device 108 for connecting to devices on the network 112, such as the remote system 110.

For example, the connectivity issues experienced by the first device 106 may be isolated given the location of the first device 106 relative to the AP 120, interference(s) from other communication technologies or protocols within the environment 102 (e.g., microwaves), obstructions (e.g., walls, doors, etc.), etc. However, other devices within the environment 102, such as the second device 108, may not experience similar issues given their respective placement within the environment 102, for instance. The second device 108 may also have a more robust connection with the remote system 110 via a communication protocol utilized by the second device 108 to connect with the AP 120 and/or the location of the second device 108 relative to the AP 120. As such, despite the first device 106 not having connectivity, or experiencing poor connectivity, the second device 108 may have connectivity with the remote system 110 via the AP 120. In such instances, the first device 106 may communicatively couple to the second device 108 to connect to the remote system 110 and/or may refrain from communicating with the remote system 110 via the failed connection. Instead, the first device 106 may utilize the communication channel 128. As such, the second device 108 may support communications between the first device 106 and the remote system 110 via the AP 120.

For example, the first device 106 and the second device 108 may establish a communication channel 128 (or connection) between one another. In some instances, the communication channel 128 may utilize various communication technologies or protocols, such as Bluetooth (e.g., 802.11), NFMI, BLE, ZigBee (e.g., 802.15.4), Bluetooth HFP protocol, Z-wave, or the like. In some instances, more than one communication channel may be established between the first device 106 and the second device 108, or stated alternatively, the first device 106 and the second device 108 may maintain multiple communication channels. In some instances, establishing the communication channel 128 may involve the second device 108 issuing a directive or an instruction to the first device 106 to accept a pairing request. To establish the communication channel 128, or in the process of establishing the communication channel, the first device 106 and the second device 108 may exchange identifiers (e.g., make, model, chipset, characteristics, etc.).

In some instances, the remote system 110 may select the second device 108 among a plurality of devices for communicating with the first device 106 and establishing the communication channel 128. For example, as discussed in detail herein, the remote system 110 may utilize a device election algorithm for selecting a device to communicate with the first device 106 and establish the communication channel 128. In some instances, the remote system 110, or the device election algorithm, may take into consideration a proximity of each of the plurality device(s) relative to the first device 106, a proximity of each of the plurality of device(s) relative to the AP 120, a signal strength of the each of the plurality of device(s) with the remote system 110 and/or the AP 120, a bandwidth or capability of each of the plurality of device(s) to communicate with the first device 106, communication technologies or protocols of each of the plurality of device(s), and/or a historical record of communication between each of the plurality of device(s) and the first device 106. Using these or other characteristics, the device election algorithm may rank the plurality of device(s) and select the second device 108, which may represent the highest ranked or most suitable plurality of device(s) for establishing the communication channel 128.

In some instances, once the remote system 110 (or the device election algorithm) selects the second device 108, the remote system 110 may transmit an instruction to the second device 108 to communicate with the first device 106. In some instances, the instruction may include a device location service (DLS) of the first device 106, the media access control (MAC) address of the first device 106, a device serial number (DSN) of the first device 106, and/or the last known internet protocol (IP) address of the first device 106. The second device 108 may utilize this information to locate or otherwise establish the communication channel 128.

Upon the communication channel 128 being established, the first device 106 and/or the second device 108 may transmit an acknowledgment to the remote system 110. The acknowledgment may serve to confirm, to the remote system 110, that the communication channel 128 was successfully established. In some instances, if the remote system 110 does not receive the acknowledgment within a predetermined amount of time, or the communication channel 128 is experiencing issues (e.g., packet loss, etc.), the remote system 110 may select a next-best or other device among the plurality of device(s) for establishing the communication channel 128 (or an additional communication channel with the first device 106).

Once the communication channel 128 is established, the first device 106 may transmit a status of the connection between the first device and the remote system 110 to the second device 108 via the communication channel 128. The status may indicate current connection details of the first device 106 with the AP 120, the amount of time the first device 106 lacked connection with the AP 120, a signal strength between the first device 106 and the remote system 110 and/or the AP 120, the recommendations provided by the network analyzer component 122 to resolve the connection, the number of failed requests the first device 106 experienced during the connectivity loss (e.g., retransmissions, PER, packet loss, etc.), and/or other information pertaining to the connection between the first device 106, the remote system 110, and/or the AP 120. Such information may be utilized by the remote system 110 for troubleshooting the connection, diagnosing connection issues, and/or performing one or more actions (e.g., contacting ISP, directing first device 106 to establish alternate connections with the AP 120, switching communication channels and/or frequency bands, etc.).

In some instances, the communication channel 128 may terminate based at least in part on the first device 106 regaining or reestablishing a connection with the remote system 110. That is, while the communication channel 128 is established, the network analyzer component 122 may continue to troubleshoot and/or resolve connectivity issues with the remote system 110 and/or the AP 120. Accordingly, despite the first device 106 not utilizing the connection with remote system 110 for transmitting and receiving data (instead using the communication channel 128), the network analyzer component 122 may monitor the connection to determine whether the connection is able to support such transmission. For example, the network analyzer component 122 may determine whether the connection has been reestablished, will support data transfer without buffering (e.g., high signal strength), or whether the channel has a quality (e.g., low congestion, low SNR, etc.) sufficient to support data transfer.

Reestablishing the connection may also switch the first device 106 from being in soft AP mode to the external mode, which in some instances, may configure the first device 106 to reject pairing request from other devices. In some instances, the first device 106 and/or the second device 108 may transmit an indication to the remote system 110 indicating the termination of the communication channel 128 and/or that the first device 106 has regained connectivity with the remote system 110.

In some instances, as the first device 106 may lose connectivity with the network 112, the remote system 110, and/or the AP 120, the network analyzer component 122 may be self-sufficient and able to operate without such connections. However, upon establishing the communication channel 128, the analysis performed by the network analyzer component 122 may be supplemented with an analysis performed by the remote system 110 to resolve, repair, or reestablish the connection. For example, the remote system 110 may perform its own analysis on the loss of connection with the first device 106, and the results of this analysis (e.g., troubleshooting, recommendations, etc.) may be transmitted to the first device 106. The first device 106 may therein utilize its own analysis, as determined from the network analyzer component 122, with the analysis of the remote system 110, to reestablish connectivity. As such, the network analyzer component 122 may be self-sufficient and self-healing to resolve connectivity issues with the remote system 110.

As shown in FIG. 1, the second device 108 may similarly include processor(s) 130 and memory 132 storing, or otherwise having access to, a network analyzer component 134. The network analyzer component 134 of the second device 108 may perform similar operations as the network analyzer component 122 of the first device 106 to monitor the connectivity with the network 112, the remote system 110, and/or the AP 120 and/or a signal strength with the remote system 110, the network 112, and/or the AP 120.

Figure 2:
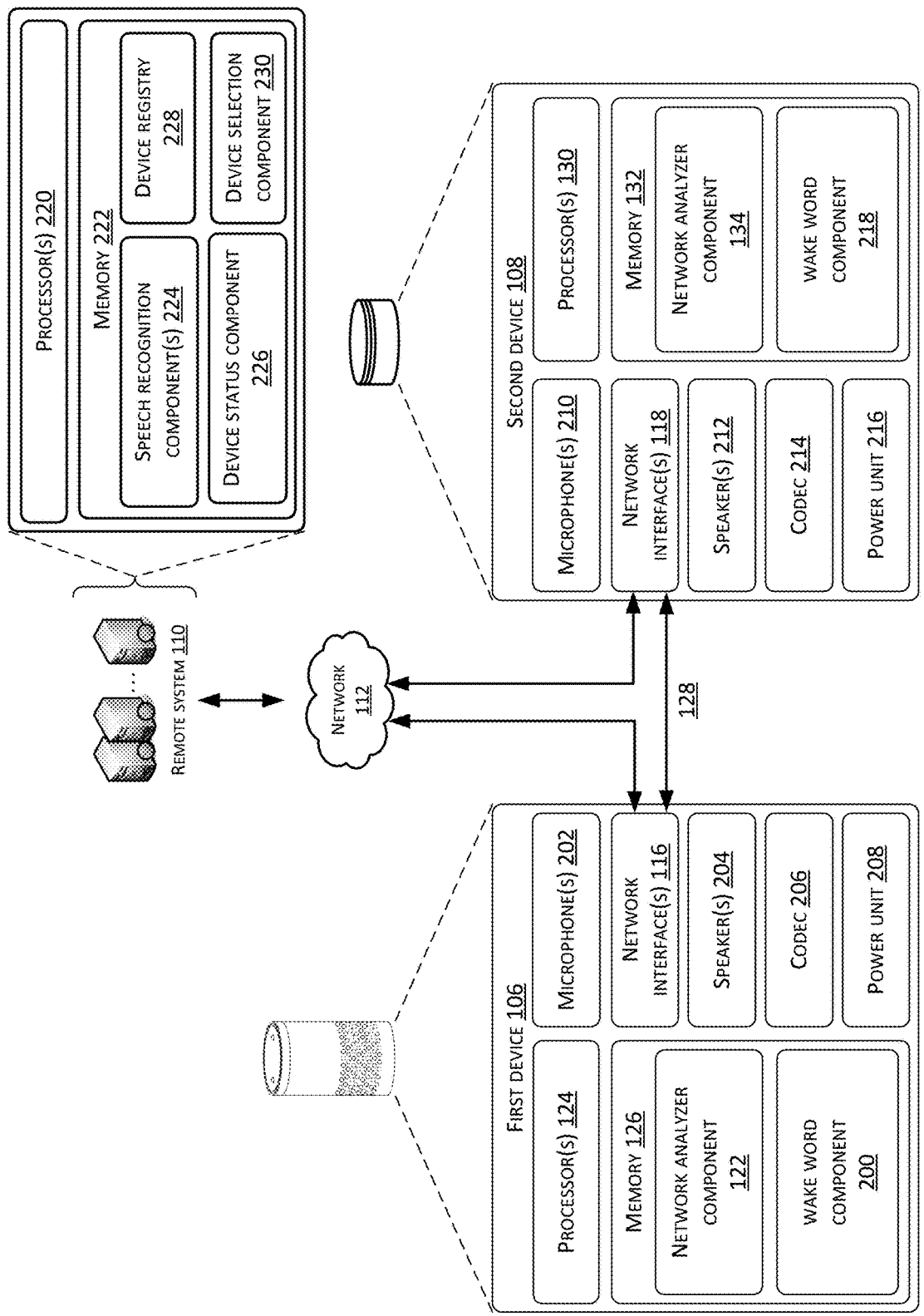
FIG. 2 illustrates a functional block diagram of the one or more devices of FIG. 1, as well as communication channels between the one or more devices, according to an embodiment of the present disclosure.

FIG. 2 illustrates selected functional components of the first device 106, the second device 108, and the remote system 110. Beginning with the first device 106, and as discussed above in FIG. 1, the first device 106 may include the processor(s) 124 and the memory 126, which stores or otherwise has access to the network analyzer component 122. As introduced above, the network analyzer component 122 may determine a strength of connection between the first device 106, the remote system 110, and/or the AP 120 (e.g., a PER, a RSS, speed, etc.). In some instances, if the first device 106 experiences poor connectivity or failed connectivity with the remote system 110 and/or the AP 120, the network analyzer component 122 may recommend one or more corrective actions and/or may reconfigure the first device 106 to accept pairing or peer requests from other devices (e.g., in soft AP mode), such as the second device 108. As an example, if the RSS between the first device 106 and the AP 120 is less than an RSS threshold, the first device 106 may be unable to receive data from the remote system 110 without buffering. Additional details of the network analyzer component 122, or operations performable by the network analyzer component 122, are discussed in FIG. 3.

The memory 126 may also store or otherwise have access to a wake word component 200. The wake word component 200 may work in conjunction with other components of the first device 106. For example, the processor(s) 124 of the first device 106 may convert captured audio into audio data and may process the audio data with the wake word component 200. The wake word component 200 may be configured to detect predetermined utterances, voice commands, and/or wake words within user commands, such as the user command 114. Such process may be referred to as keyword detection, with the wake word being a specific example of a keyword. For instance, in capturing and generating audio data, the audio data may be analyzed to determine if specific characteristics of the user speech match preconfigured acoustic waveforms, audio signatures, keyword-spotting technology, automatic speech recognition (ASR) techniques, or other expression detectors "matches" stored audio data corresponding to a keyword. Additionally, or alternatively, the wake word component 200 may include APIs, speech-processing application(s), a digital signal processor, and/or other components to detect commands and wake words uttered by a user. The wake word component 200 may therefore detect a predefined trigger expression or words, which may be followed by instructions or directives (e.g., "please play song A," "please give me directions to the grocery store," etc.). Accordingly, the first device 106 is designed to support audio interactions with the user 104, in the form of receiving voice commands (e.g., words, phrase, sentences, etc.) from the user 104 and outputting audible feedback to the user. Regardless of whether the speech processing occurs locally or remotely from the environment 102, the first device 106 may receive vocal input from the user 104 and the first device 106 and/or the remote system 110 may perform speech recognition to interpret a user's operational request or command. The commands may be for essentially type of operation, such as database inquires, requesting and consuming entertainment (e.g., gaming, finding and playing music, movies or other content, etc.), personal management (e.g., calendaring, note taking, etc.), online shopping, financial transactions, and so forth.

The first device 106 may include the network interface(s) 116 to communicate over the network 112 and the AP 120 to send and receive data with various computing devices, such as the second device 108 and/or the remote system 110. The network interface(s) 116 may enable the first device 106 to communicate over any type of network, such as wireless networks (e.g., Wi-Fi, Bluetooth, Personal Area Networks, Wide Area Networks, and so forth). The first device 106 may further include network interface(s) and/or ports that facilitate wired connections to the second device 108 and/or the network 112, and/or a plug-in network device that communicates with other wireless networks.

In some instances, specifics of the communication channel 128 may depend on communication technologies or protocols of the first device 106 and the second device 108. For example, if the first device 106 and the second device 108 include Bluetooth network interfaces, the first device 106 and the second device 108 may communicatively couple via a Bluetooth connection. Using the communication channel 128, the first device 106 may transmit and/or receive data from the remote system 110 via the second device 108 and the AP 120. That is, in some instances and based at least in part on a failed connectivity and/or interrupted connectivity with the AP 120, the first device 106 may communicatively couple to the remote system 110 via the second device 108 using the communication channel 128. The second device 108 may serve as an interface between the first device 106 and the remote system 110.

The first device 106 may include one or more microphone(s) 202 to capture user speech and generate audio data associated with user utterances and/or commands. The first device 106 may also include one or more speakers(s) 204 to output audio data received from the remote system 110, the second device 108, and/or other computing devices. A codec 206 may communicatively couple to the microphone(s) 202 and/or the speaker(s) 204 to encode and decode audio signals, respectively. The codec 206 may also convert audio data between analog and digital formats. In some instances, the codec 206 may encode user speech and transfer the audio data to other components of the first device 106, such as the wake word component 200.

A power unit 208 is further provided to distribute power to the various components of the first device 106. In some instances, the first device 106 may be mains powered or may include a battery for cordless operation.

The second device 108 may include similar components as the first device 106, such as one or more microphone(s) 210, one or more speaker(s) 212, a codec 214, and a power unit 216. Additionally, as discussed in relation to FIG. 1, the second device 108 may include the processor(s) 130, the memory 132, which may store or otherwise have access to the network analyzer component 134. The second device 108 also includes the network interface(s) 118 that communicatively couple the second device 108 to other computing devices (e.g., the first device 106). FIG. 2 further illustrates that the memory 132 may store or otherwise have access to a wake word component 218 to detect wake words within user speech.

As discussed above, the first device 106 and/or the second device 108 may operate in conjunction with the remote system 110. For example, once the wake word is detected, the first device 106 may transmit audio data to the remote system 110 for speech processing. The remote system 110 may analyze the user speech, perform certain actions, generate one or more responses, cause certain actions to be performed, and/or transmit a response to the first device 106. The remote system 110 may be implemented as one or more servers and may, in some instances form a portion of a network-accessible computing platform implemented as a computing infrastructure of processors, storage, software, data access, and so forth that is maintained and accessible via a network such as the Internet. Cloud-based systems may not require end-user knowledge of the physical location and configuration of the system that delivers the services. Common expressions associated for the remote system 110 include "on-demand computing", "software as a service (SaaS)", "platform computing", "network-accessible platform", "cloud services", "data centers", and so forth. The remote system 110 may include processor(s) 220 and memory 222 that stores or otherwise has access to speech recognition component(s) 224. The speech recognition component(s) 224 may analyze or perform speech processing on user commands to determine an intent of the user 104 and/or other users with the environment 102. In some examples, the first device 106 and/or the second device 108 may upload audio data to the remote system 110 for processing given that the remote system 110 may have a computational capacity that far exceeds the computational capacity of the first device 106 and/or the second device 108. Therefore, the first device 106 and/or the second device 108 may utilize the speech recognition component(s) 224 for performing relatively complex analysis on captured audio.

To perform speech processing, the speech recognition component(s) 224 may include ASR components, NLU components, NLP components, text-to-speech components, and/or speechlets. For example, the ASR component may process the audio data to generate text data corresponding to the audio data. The NLU component may utilize the text data to determine an intent associated with the user utterance, where the intent is utilized to select and/or utilize the one or more speechlets, which may be utilized to generate a response or command to perform in response to the user utterance. Generally, the NLU process takes textual input (such as processed from ASR based on the utterance input audio) and attempts to make a semantic interpretation of the text. The NLU process determines the meaning behind the text based on the individual words and then implements that meaning. NLU processing interprets a text string to derive an intent or a desired action from the user as well as the pertinent pieces of information in the text that allow a device (e.g., the first device 106) to complete that action. For example, if a spoken utterance is processed using ASR and outputs the text "play Song A" the NLU process may determine that the user intended to have audio corresponding to Song A played. The NLU process may parse and tag to annotate text as part of NLU processing. For example, for the text "play Song A," "play" may be tagged as a command (to output audio) and "Song A" may be tagged as the identifier of the audio to be output. The output data from the NLU processing (which may include tagged text, commands, etc.) may then be sent to the processor(s) 220 for outputting the audio data associated with Song A. As such, the speech recognition component(s) may receiving audio signals from the first device 106 and/or the second device 108, recognize speech and, in some instances, may cause actions to be performed.

The remote system 110 may further include a device status component 226, a device registry 228, and/or a device selection component 230. The device status component 226 may monitor a status of devices communicatively coupled to the network 112 and/or the remote system 110. In some instances, the device status component 226 may determine a network connectivity of the devices through receiving status updates and/or indicators from the devices and/or monitoring a connectivity of the devices. Such status indicators may be utilized to determine the signal strength of the devices with the remote system 110 and/or the AP 120 or whether the devices are connected to or disconnected from the remote system 110 and/or the AP 120. For example, the device status component 226 may periodically receive indicators from the first device 106 and/or the second device 108 that indicate the connection status (or strength). The device status component 226 may also determine a packet loss (or PER) or retransmission of packets associated with transmissions to the devices. Additionally, the device status component 226 may determine a signal strength of the connection between the first device 106, the remote system 110, and/or the AP 120 (e.g., RSS, RSSI, dBm, mW, etc.). Using this information, the device status component 226 may maintain a registry of devices connected to the network 112 via the AP 120, those devices on the network 112 which utilize the remote system 110 (e.g., for performing speech processing), and the details or characteristics of such connections. Additionally, or alternatively, to determine the connection status, the device status component 226 may ping the devices on the network 112 and request their status. In some instances, if the devices do not respond (e.g., acknowledgment), or take longer than a predetermined time to respond (e.g., latency), the device status component 226 may utilize this information to determine the network status of the devices. Such information may be used by the device status component 226 to monitor the health of the connections with devices on the network 112 and/or take one or more corrective actions.

The device registry 228 may maintain a list or registry of devices communicatively coupled to the network 112, the remote system 110, and/or the AP 120. In some instances, the device registry 228 may maintain characteristics of the devices, such as communication protocols or technologies, IP addresses, MAC addresses, DLS, and/or a location of the device within the environment 102. For example, the device registry 228 may store an indication that the first device 106 includes Wi-Fi, Bluetooth, and NFMI network interfaces. In some instances, as the device status component 226 determine the connectivity of the devices, the remote system 110 may store this information within the device registry 228.

The device selection component 230 may be utilized by the remote system 110 when selecting or otherwise determining the second device 108 for communicating and/or establishing the communication channel 128 with the first device 106. In some instances, as the device selection component 230 may select a device (i.e., the second device 108) for communicating with the first device 106, the device selection component 230 may be referred to as a device master selection component. In some instances, the device selection component 230 may operate in conjunction with, or utilize the analysis performed by, the device status component 226. Additionally, or alternatively, the device selection component 230 may utilize the device registry 228. For example, the device status component 226 maintain a running list or plurality of devices capable of communicating and/or establishing a connection with the first device 106 and the device selection component 230 may utilize this information to select a most compatible device for establishing the communication channel 128. For example, the device selection component 230 may query a DLS to determine devices that may communicate with the first device 106. In some instances, the device selection component 230 may select the second device 108 based on a device election algorithm.

The device election algorithm, which may be implemented by the device selection component 230, may take into account or consider certain factors, characteristics, or criteria when selecting the second device 108 among the plurality of other devices within the device registry 228. For example, the device selection component 230 may consider network connectivity strengths of the plurality of devices with the remote system 110 and/or the AP 120, the proximity of the plurality devices relative to the first device 106 (e.g., topology), a stability of the connection between the plurality of devices and the remote system 110 and/or the AP 120 (e.g., from previous empirical data), an ability to maintain network connections with the first device 106 over extended periods of time, a connectivity of the plurality of other devices with other devices in the environment 102 (e.g., congestion), and/or communication technologies of the plurality of other devices. Using these factors, the device selection component 230 may score the plurality of devices and select the second device 108 for pairing within the first device 106.

In some instances, the device selection component 230 may rank of the plurality of devices based at least in part on the aforementioned criteria (or score). The rank may indicate the appropriateness or suitability of utilizing each of the plurality of devices for communicating and establishing the communication channel 128 with the first device 106. In some instances, the remote system 110 may select a highest-ranked or most suitable device. For example, the remote system 110 may select the second device 108 for communicating with the first device 106 based on the second device 108 being in close proximity to the first device 106, the second device 108 being configured to support a 5.0 GHz frequency band with the first device 106, and/or the second device 108 having a threshold connection strength with the AP 120. After selecting or determining the second device 108, the remote system 110 may communicate an instruction or request to the second device 108 to establish the communication channel 128.

In some instances, the instruction may include identifying information of the first device 106 (using the device registry 228) that the second device 108 uses when locating and establishing the communication channel 128. As discussed above, the first device 106 may be configured to accept peer requests from other devices (i.e., the second device 108) based on the first device 106 being in soft AP mode. Additionally, when the first device 106 is in soft AP mode, the first device 106 may communicatively couple to the remote system 110 via other devices acting as an AP. As such, the second device 108 may become an AP for connecting the first device 106 to the network 112.

The remote system 110 may also monitor the communication channel 128 (e.g., RSSI, PER, etc.) to determine a health of the communication channel 128. If the communication channel 128 has a poor signal strength or is experiencing connectivity issues, the remote system 110 may select another device for communicating and establishing the communication channel 128 with the first device 106. Additionally, or alternatively, the remote system 110 may monitor the communication channel 110 to determine how well the combination of the master device (e.g., second device 108) and the client device (e.g., first device 106) performed. Analyzing or monitoring the performance may be used to update the device election algorithm for use in selecting the master device. As an example, based on the monitoring, the remote system 110 may determine that the communication channel 128 is performing poorly, and as a result, in future instances, may use this indication to select a third device for communicating with the first device 106 and establishing a communication channel.

Further, the remote system 110 may learn patterns associated with connectivity issues to be able to predict and forecast potential losses of connectivity, or when the connectivity may fall below a threshold. In some instances, the remote system 110, such as the device status component 226 or the device selection component 230 may receive feedback to determine what recommendations resolved the connectivity issues and/or what recommendations did not resolve the connectivity issues. This feedback loop may be used by the remote system 110 in future instances when diagnosing connectivity issues, providing recommendations, and/or troubleshooting connectivity issues.

In some instances, the remote system 110 may distinguish between devices that are intentionally shut down or turned off, and devices that lose connectivity or have a strength lower than a threshold. For example, in the former, upon shutting down, or as part of shutting down, the first device 106 may transmit an indication to the remote system 110 notifying the remote system 110 that the first device 106 is intentionally shutting down. The indication may be stored in the device registry 228. Accordingly, the device status component 226 may utilize this indication to understand that the first device 106 is not experiencing connectivity issues, but instead, has been intentionally shut down and is offline.

As used herein, a processor, such as processor(s) 124, 130 and/or 220 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 126, 132, and/or 222 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIGS. 3-8 illustrate various processes related to monitoring network connectivity, analyzing conditions associated with the network connectivity, and/or taking one or more corrective actions to troubleshoot issues associated with the network connectivity. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 2, although the processes may be implemented in a wide variety of other environments, architectures and systems.

Figure 3:
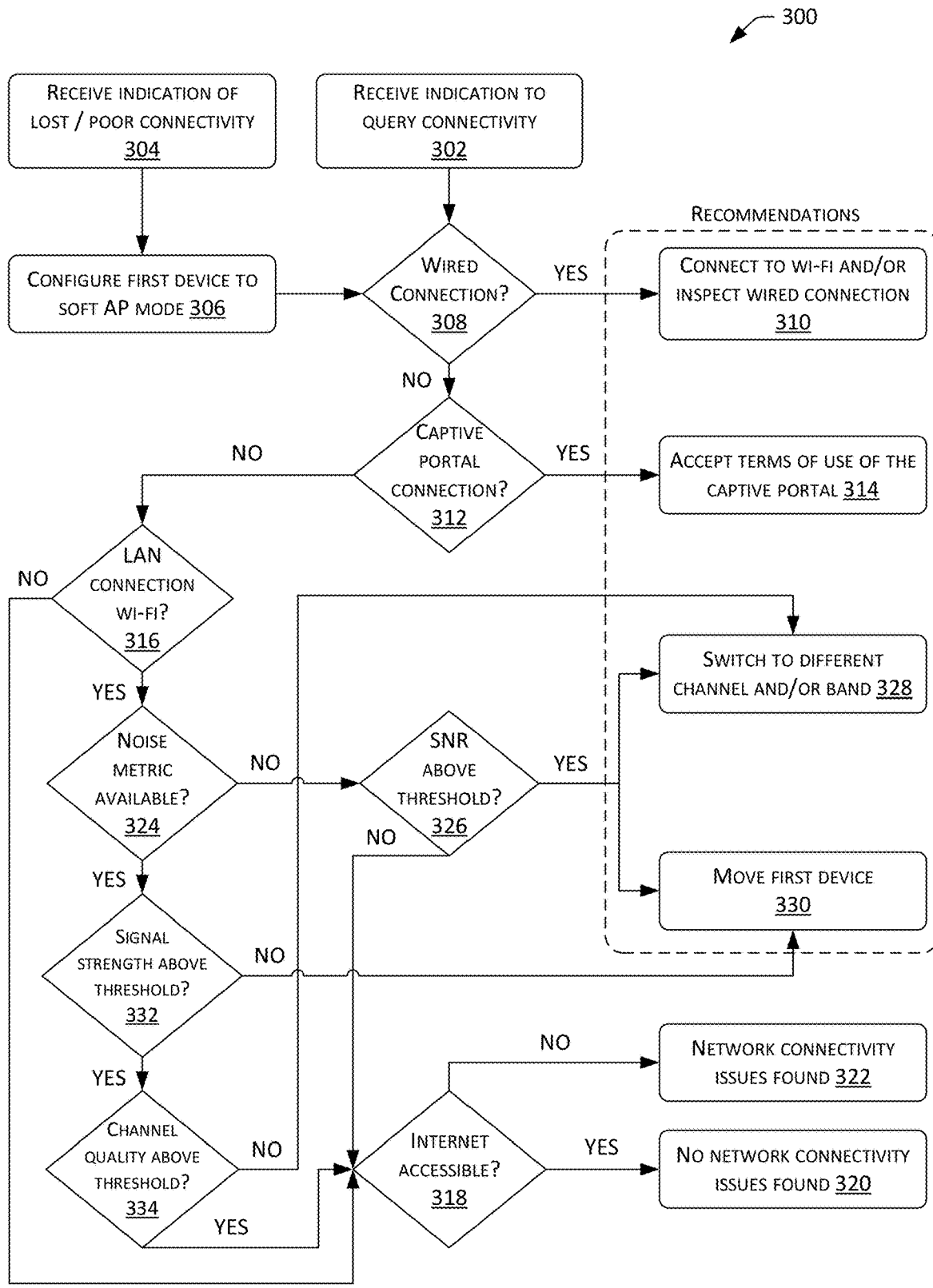
FIG. 3 illustrates an example process for analyzing network connectivity, according to an embodiment of the present disclosure.

FIG. 3 illustrates an example process 300 for analyzing a connectivity of the first device 106 and providing one or more recommendations based on the connectivity. In some instances, the process 300 may be performed by the first device 106, such as the network analyzer component 122.

In some instances, the process 300 may begin at 302, whereby the process 300 may receive an indication to query the connection between the first device 106, the remote system 110, and/or the AP 120. In such instances, the first device 106 (or components thereof) may explicitly perform the process 300, such as when requested by the user 104. For example, the user 104 may state a command, such as "How is my connectivity," and in response, the process 300 may be performed. In other instances, the process 300 may begin at 304, whereby the process 300 may receive an indication that the first device 106 is not connected to the remote system 110 and/or the AP 120, or when the first device 106 is experiencing poor connectivity (e.g., latency). In such instances, the first device 106 (or components thereof) may implicitly perform the process 300. For example, the network analyzer component 122 may receive an indication that the first device 106 is not connected to the network 112. Additionally, or alternatively, the network analyzer component 122 may receive an indication from application(s) installed on the first device 106 indicating the poor and/or failed connectivity.

From 304, the process 300 may proceed to 306, whereby the process 300 may configure the first device to a soft AP mode or configure the first device 106 to receive pairing requests from other devices, such as the second device 108, to connect to the remote system 110 via the AP 120. For example, configuring the first device 106 to a soft AP mode may involve configuring network interfaces (e.g., Wi-Fi) to accept pairing requests from the second device 108. Regardless of whether the process 300 begins at 302 or 304, the process 300 may proceed to 308.

At 308, the process 300 may determine whether the first device 106 is connected to the remote system 110 and/or the AP 120 via a wired, ethernet, or local area network (LAN) connection. For example, the network analyzer component 122 may determine whether the connection between the first device 106, the remote system 110, and/or the AP 120 is wired. Such determination may be used to indicate that the first device 106 is not connected to the network 112 via Wi-Fi, or other wireless technologies, but instead, may be wired to the AP 120. If the first device 106 includes a wired connection, the first device 106 may provide one or more recommendations. For example, as shown in FIG. 3, if the first device 106 includes a wired connection, the process 300 may follow the "YES" route and the first device 106 may provide one or more recommendation(s), such as audibly prompting the user 104 to wirelessly connect to the AP 120 and/or to inspect the wired connection 310. In some instances, the recommendations may be presented on a display of a device associated with the user 104, such as a mobile phone. Alternatively, if at 308 the process 300 determines that the first device 106 does not include a wired connection, the process 300 may follow the "NO" route to 312.

At 312, the process 300 may determine whether the connection between the first device 106, the remote system 110, and/or the AP 120 is or includes a captive portal connection. In some instances, a captive portal connection may interfere or provide limited network connectively between the first device 106, the remote system 110, and/or the AP 120 until the user 104 is verified and/or accepts terms of use. For example, users may be required to provide login information or accept terms of use before connecting with the remote system 110. With the captive portal connection, for example, the first device 106 may be online within a local environment but unable to access the remote system 110. If at 312, the process 300 determines that the connection is a captive portal connection, the process 300 may follow the "YES" route and provide one or more recommendation(s), such as prompting the user 104 to accept terms of user of the captive portal 314. In some instances, using the mobile device, for example, the user 104 may accept the terms of use and/or enter authentication requirements (e.g., username, password, etc.). Alternatively, if at 312 the process 300 determines that the connection is not a captive portal connect, the process 300 may follow the "NO" route to 316.

At 316, the process 300 may determine whether the LAN connection is wirelessly connected to the remote system 110 and/or the AP 120, or includes a Wi-Fi connection. For example, the network analyzer component 122 may query the network interface(s) 116 (or other components, APIs, etc.) to determine whether the first device 106 is connected to the remote system 110 and/or the AP 120 via wired or wireless technologies (i.e., how the first device 106 is connected to the remote system 110). Accordingly, in some instances, the first device 106 may include a LAN connection and may include a wired connection with the AP 120. Alternatively, the first device 106 may wirelessly connect to the AP 120, in which case, the LAN connection may include a Wi-Fi connection. If, at 316, the process 300 determines that that the LAN connection does not include Wi-Fi, the process 300 may proceed to 318.

At 318, the process 300 may determine whether the network 112, such as the internet, is accessible. For example, the network analyzer component 122 may determine whether the first device 106 is able to access the internet. If at 318, the process 300 determines that the network 112 is accessible, the process 300 may follow the "YES" route to 320, where the process 300 may determine that no connectivity issues were found. Alternatively, if at 318 the process 300 determines that the network 112 is not accessible, the process 300 may follow the "NO" route to 322. For example, the network analyzer component 122 may determine that the first device 106 is able to locally connect to the AP 120, but that the AP 120 is unable to connect to the remote system 110. That is, the first device 106 may be connected to the AP 120, but might not be connected to the internet and the remote system 110 based on outages experienced by the ISP. In such instances, at 322, the process 300 may provide one or more recommendations to resolve connectivity issues and/or may rely on the first device 106 configuring to a soft AP mode to connect to the network 112 via the second device 108.

At 316, if the process 300 determines that the LAN connection includes Wi-Fi, the process 300 may follow the "YES" route and proceed to 324. At 324, the process 300 may determine whether noise metrics, such as a channel quality (e.g., congestion, SNR, PER, packet loss, interferences, etc.) and a signal strength (e.g., speed, RSSI, RSS, dBm, etc.) are available for the connection between the first device 106, the remote system 110, and/or the AP 120, and/or whether the channel quality and signal strength are received as separate signals. For example, the network analyzer component 122 may determine whether a signal strength and quality of the connection between the first device 106, the network 112, and/or AP 120 is measurable, quantifiable, or computable. However, if signal strength and the channel quality are combined within a single signal, such that the channel quality and signal strength cannot be distinguished, the process 300 may determine that the signal strength and the channel quality are not available. Hence, the process may determine a SNR, in which instances, may represents that either the signal strength may be poor or the channel quality may be poor. If at 324, the process 300 determines that the noise metrics are not available, the process 300 may follow the "NO" route and proceed to 326.

At 326, the process 300 may determine whether the SNR is above a threshold. For example, the network analyzer component 122 may determine the SNR associated with the connection between the first device 106 and the AP 120, and may compare this SNR to a threshold SNR. For example, the network analyzer component 122 may determine that the SNR exceeds the threshold SNR, which may be caused by congestion on a communication channel associated with the connection between the first device 106 and the AP 120, If the process 300 determines that the SNR is below the threshold, the process 300 may follow the "NO" route and proceed to 318. Alternatively, if the process 300 determines that the SNR is above the threshold SNR, the process 300 may follow the "YES" route and proceed to 328 and/or 330. In some instances, the "YES" route from 326 may represent a scenario where the signal strength between the first device 106 and the AP 120 is below the threshold signal strength and the channel quality is below the threshold channel quality.

At 328, the process 300 may provide one or more recommendation(s), such as switching to a different channel. For example, previously, the first device 106 may be connected to the AP 120 using a 2.4 GHz band, and at 328, the recommendation may be to switch the connection to a 5.0 GHz band. In some instances, when multiple devices are sharing the same channel and/or band, the first device 106 may experience latency caused by congestion and/or noise. Accordingly, to reduce a SNR, the process 300 may recommend switching channel(s) and/or bands. In some instances, the first device 106 may automatically switch between channels and/or bands such that no input or action is required by the user 104.

At 330, the process 300 may provide one or more recommendation(s), such as prompting the user 104 to move the first device 106 closer to the AP 120. For example, the first device 106 may be experiencing poor connectivity given the location of the first device 106 relative to the AP 120. In some instances, moving the first device 106 closer to the AP 120 (or removing other obstacles) may increase the signal strength of the connection.

At 324, if the process 300 determines that the noise metrics are available, the process 300 may follow the "YES" route and proceed to 332. At 332, the process 300 may determine whether the signal strength between the first device 106, the remote system 110, and/or the AP 120 is above a threshold strength. For example, the network analyzer component 122 may determine a RSS of the connection between the first device 106 and the AP 120 and may compare this RSS to the threshold RSS. Noted above, the RSS may represent a measurement of the strength of a received signal at the first device 106 from the AP 120. In some instances, the threshold RSS may represent a signal strength that supports the transmission of data between the first device 106 and the AP 120 without buffering. For example, the network analyzer component 122 may determine that the Wi-Fi signal strength is low and unable to support data transmission. If at 332, the process 300 determines that the signal strength is not above the threshold strength, the process 300 may follow the "NO" route and proceed to 330, whereby the process 300 may recommend moving the first device 106. Alternatively, if at 332 the process 300 determines that the signal strength is above the threshold strength, the process 300 may proceed to 334.

At 334, the process 300 may determine whether the channel quality is above a threshold. For example, the network analyzer component 122 may determine the channel quality between the first device 106, the remote system 110, and/or the AP 120 and may compare the channel quality with a threshold channel quality. In some instances, the channel quality may be based on interferences from other communication channels in the environment 102 (e.g., microwave). Additionally, or alternatively, the channel quality may be based on a SNR, a signal-to-interference plus noise ratio (SINR), a signal-to-noise plus distortion ratio (SNDR), latency, jitter, packet loss, PER, rate of data transfer, and/or a congestion of devices (e.g., interferences). For example, the network analyzer component 122 may determine that a threshold number of packets are not reaching the remote system 110 and/or the AP 120, a threshold number of packets are being retransmitted by the first device 106, and/or a channel associated with the connection between the first device 106, the remote system 110, and/or the AP 120 is congested with multiple communications between other devices, and/or has a high SNR. If at 334, the process 300 determines that the channel quality is not above the threshold channel quality, the process 300 may follow the "NO" route to 328. Alternatively, at 334, if the process 400 determines that the channel quality is above the threshold channel quality, the process 300 may follow the "YES" route and proceed to 318.

After performing the process 300, and/or causing the one or more recommendations to be performed and/or presented, the process 300 may repeat to determine whether the network connectivity issues were resolved and/or repaired. For example, after performing one or more recommendations, such as switching a frequency band associated with the connection between the first device 106 and the AP 120, the network analyzer component 122 may rerun the process 300 to determine whether the connection has been resolved or repaired.

Additionally, as the first device 106 may lose connectivity with the remote system 110 and/or the AP 120, the network analyzer component 122 may be self-sufficient and able to operate without such connections. The network analyzer component 122 may be trained, or train one or more models, to learn patterns associated with connectivity issues to predict and forecast potential losses of connectivity, or when the connectivity may fall below a threshold. In some instances, upon performing one or more recommendations, the network analyzer component 122 may determine outcomes to identify what recommendations resolved the connectivity issues and/or what recommendations did not resolve the connectivity issues. This feedback loop may be used to self-tune or train the network analyzer component 122 in future instances when diagnosing connectivity issues, providing recommendations, and/or troubleshooting connectivity issues. Additionally, upon establishing the communication channel 128, the analysis performed by the network analyzer component 122 may be supplemented with an analysis performed by the remote system 110 to resolve, repair, or reestablish the connection. For example, the remote system 110 may perform its own analysis on the loss of connection with the first device 106, via the device status component 226, and the results of this analysis may be transmitted to the first device 106. The first device 106 may therein utilize its own analysis, as determined from the network analyzer component 122, or feedback, with the analysis of the remote system 110 to reestablish connectivity.

In some instances, using recommendations, the user 104 may request certain actions to be performed. For example, the user 104 may request, in the form of a verbal command, for the first device 106 to connect to a different network, or connect to the AP 120 using one or more different communication channels and/or frequency bands. Additionally, or alternatively, in instances where no connectivity issues are detected (i.e., 320), an indication may be presented to the user 104 indicating such. For example, in response to the user issuing a verbal command, such as "What is the status of my connection?" the first device 106 may perform the operations of the process 300, and upon determining that there are no network connectivity issues, the first device 106 may output a response, such as "Your connection is fine." Accordingly, the user 104 is provided the opportunity to explicitly query the connectivity of the first device 106 and/or ask for recommendations to increase a strength or quality of the connection. To understand and/or recognize these requests of the user 104, noted above, the first device 106 may include voice-processing components to support instances where the first device 106 is not connected to the remote system 110 and/or experiencing connectivity issues.

Figure 4:
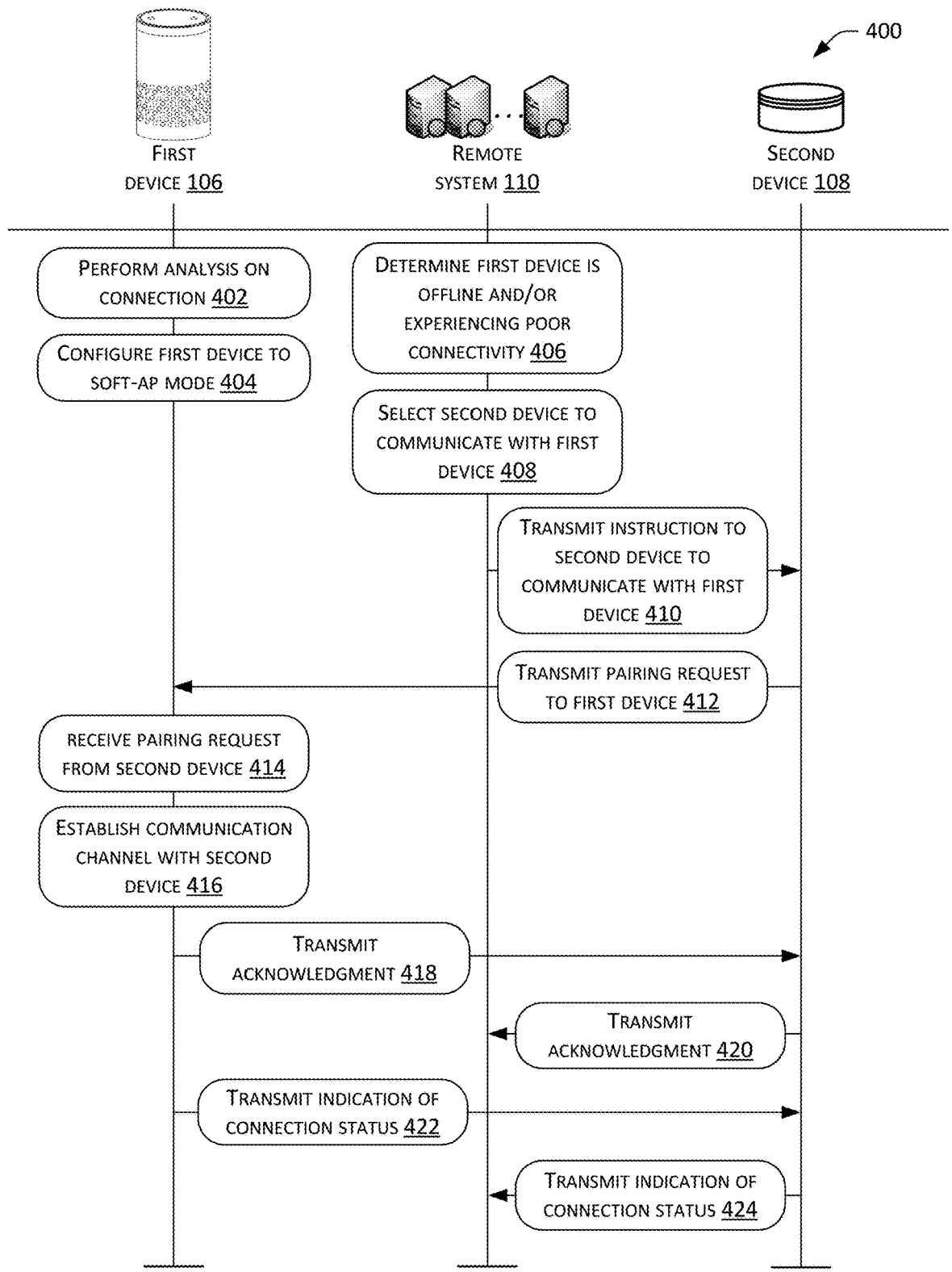
FIG. 4 illustrates an example signal diagram for establishing communication channel(s) between the one or more of devices FIG. 1, according to an embodiment of the present disclosure.

FIG. 4 illustrates a signal diagram of an example process 400 for establishing a communication channel between devices and transmitting data between the devices using the established communication channel. In some instances, the process 400 may be performed by the first device 106, the second device 108, and/or the remote system 110.

At 402, the process 400 may analyze a connection between the first device 106, the remote system 110, and/or the AP 120. For example, the network analyzer component 122 may determine a strength of connectivity between the first device 106, the remote system 110, and/or the AP 120 using the process 300 described previously.

At 404, the process 400 may configure the first device 106 to a soft AP mode. For example, the processor(s) 124 of the first device 106 may configure the first device 106 from an external mode to a soft AP mode. In some instances, configuring the first device 106 in soft AP mode may involve configuring the first device 106 to accept pairing or peer requests to establish a communication channel (e.g., other devices may serve as a soft AP). In some instances, the first device 106 may configure to soft AP mode based at least in part on determining that the connectivity is (or has been) terminated and/or that the connectivity is below a threshold strength.

At 406, the process 400 may determine the first device 106 is offline and/or a connection between the first device 106, the remote system 110, and/or the AP 120 is below a threshold strength. For example, the device status component 226 of the remote system 110 may determine that a connection with the first device 106 has been terminated and/or that a connection between the first device 106, the remote system 110, and/or the AP 120 is below a threshold strength or quality (e.g., RSS, congestion, interference, packet loss, etc.). In some instances, the remote system 110 may perform the operation 406 substantially, or substantially simultaneously, with the operation 402 and/or 404 to reduce latency experienced by the user 104. That is, while the first device 106 is analyzing conditions of the connection between the first device 106, the remote system 110, and/or the AP 120 and/or configuring to a soft AP mode, the remote system 110 may perform its own analysis regarding the connection between the first device 106, the remote system 110, and/or the AP 120.

At 408, the process 400 may select the second device 108 to communicate with the first device 106. For example, the device selection component 230 of the remote system 110 may employ the device election algorithm to select the second device 108 among a plurality of other devices for communicating and establishing the communication channel 128. For example, using the device selection component 230, the remote system 110 may determine that the second device 108 is the most suitable device for establishing the communication channel 128 given that the second device 108 resides within an environment of the first device 106, is able to communicatively couple to the first device 106 (i.e., communication protocols), and/or has bandwidth to receive and transmit data between the first device 106, the remote system 110, and the AP 120 (e.g., acting as an intermediary). In some instances, the device election algorithm may rank the plurality of devices and select, based at least in part on the second device 108 having the highest score, the second device 108 for communicating with the first device 106. In some instances, if the first device 106 and the second device 108 are able to communicate over multiple communication technologies (e.g., Bluetooth, BLE, ZigBee, etc.), the remote system 110 may select a least trafficked or congested communication channel, or a channel having the highest signal strength or quality. For example, the remote system 110 may have insight or receive indications regarding the amount of traffic on the respective communication channels and use these indications to select an appropriate protocol associated with the communication channel 128.

At 410, the process 400 may transmit an instruction to the second device 108 to communicate with the first device 106 and establish the communication channel 128. For example, the remote system 110 may transmit an instruction to the second device 108 that instructs the second device 108 to communicate with the first device 106 and establish the communication channel 128. In some instances, the instruction may indicate which communication protocol or technology the second device 108 is to use when establishing the communication channel 128. Additionally, the instruction may include a DSN that the second device 108 utilizes to connect with the first device 106, a MAC address of the first device 106, and/or an IP address of the first device 106, and so forth.

At 412, the process 400 may transmit a pairing request to the first device 106. For example, the second device 108 may transmit the pairing request to the first device 106 based at least in part on receiving the instruction from the remote system 110. In some instances, the pairing request may represent a request for the first device 106 to establish the communication channel 128 with the second device 108 to communicatively couple to the remote system 110.

At 414, the process 400 may receive the pairing request. For example, the first device 106 may receive the pairing request from the second device 108. In some instances, the first device 106 may be configured to receive the pairing request based at least in part on the first device 106 being in a soft AP mode (as discussed above in relation to operation 404). Accordingly, in the soft AP mode, the first device 106 may be configured to receive and/or identify the pairing request from the second device 108 such that the second device may act as a soft AP between the first device 106 and the remote system 110.

At 416, the process 400 may establish the communication channel 128 between the first device 106 and the second device 108. For example, based at least in part on receiving the pairing request, the first device 106 may accept the pairing request, and in response, the communication channel 128 between the first device 106 and the second device 108 may be established. In some instances, the communication channel 128 may include Bluetooth, ZigBee, or other communication protocols supportable by the first device 106 and the second device 108. In some instances, establishing the communication channel 128 may include the first device 106 and the second device 108 exchanging signals, data, and/or device identifiers. In some instances, based at least in part on establishing the communication channel 128, the first device 106 may refrain or stop transmitting data to the remote system 110 via the previous connection (i.e., failed or poor connection). Instead, the first device 106 may utilize the communication channel 128 for connecting to the remote system 110.

At 418, the process 400 may transmit an acknowledgment to the second device 108. For example, the first device 106 may transmit, via the communication channel 128, an acknowledgment to the second device 108 indicating that the first device 106 has accepted the pairing request with the second device 108 and/or that the first device 106 and the second device 108 are communicatively coupled via the communication channel 128.

At 420, the process 400 may transmit the acknowledgment to the remote system 110. For example, the second device 108 may transmit the acknowledgment to the remote system 110, via the AP 120, indicating that the first device 106 and the second device 108 are communicatively coupled and/or that the communication channel 128 between the first device 106 and the second device 108 is established. In some instances, the acknowledgment may serve to confirm, assure, or verify to the remote system 110 that the first device 106 and the second device 108 are communicatively coupled. In some instances, if the second device 108 fails to send the acknowledgment, or the remote system 110 fails to receive the acknowledgment within a predetermined amount of time from sending the instruction at 410, the remote system 110 may select a next-best or alternate device from the plurality of devices (i.e., the device registry 228). This alternate device may then attempt to pair with the first device 106 using the operations described herein. In such instances, the remote system 110 may transmit an indication to the second device 108 to refrain from attempting to establish the communication channel 128 with the first device 106, as the remote system 110 has requested the alternate device.

At 422, the process 400 may transmit a connection status to the second device 108. For example, the first device 106 may transmit the connection status (or an indication thereof) to the second device 108 indicating the network status of the first device 106, as determined at 402 (or from the process 300). In some instances, the connection status may be determined by the network analyzer component 122 of the first device 106, and the first device 106 may transmit this analysis, or results thereof (e.g., the recommendation(s)), to the second device 108 using the communication channel 128. For example, the first device 106 may transmit a PER between the first device 106 and the AP 120, a RSSI associated with a connection between the first device 106 and the AP 120, an amount of times the first device 106 attempted to retransmit data to the remote system 110 and/or the AP 120, and/or how long the connection between the first device 106, the remote system 110, and/or the AP 120 was terminated and/or experiencing connectivity issues.

At 424, the process 400 may transmit the connection status to the remote system 110. For example, the second device 108 may transmit the connection status to the remote system 110. In some instances, the connection status may be used to inform the remote system 110 of the connectivity of the first device 106 and/or may be used to troubleshoot one or more issues associated with the connection between the first device and the remote system 110. For example, the device status component 226 may utilize the connection status to diagnose connectivity issues experienced by the first device 106. As a result of such analysis, the remote system 110 may take one or more actions, such as attempting to reestablish a connection with the first device 106 using a different communication protocol and/or routing communications through one or more different APs, for example. Noted above, in some instances, as the connection status may indicate the current connection details of the first device 106, the total outage time of the first device 106, and/or the number of failed requests the first device 106 experienced during the connectivity loss, the remote system 110 may utilize these indications for troubleshooting and/or performing further analysis on the connection. In some instances, the connection status may serve to verify to the remote system 110 that the first device 106 was in fact experiencing connectivity issues and/or pinpoint connectivity issues associated with the connection between the first device 106 and the remote system 110.

Additionally, or alternatively, the remote system 110 may utilize the connection status to determine whether the first device 106 may act as a secondary device. For example, in some instances, the second device 108 may lose connectivity with the remote system 110 and/or the AP 120, and instead, the second device 108 may utilize a connection between the first device 106 and the remote system 110 for transmitting and receiving data. The connection status of the first device 106 may therefore be used by the remote system 110, or components thereof, to train the device election algorithm when selecting a master device to connect to a troubled device. For example, if the connection between the first device 106, the remote system 110, and/or the AP 120 historically has connection issues, the remote system 110 may utilize this information to select a third device (e.g., master device) for communicatively coupling the second device 108 (e.g., the troubled device) to the remote system 110.

In some instances, the first device 106 may, at 418, transmit the connection status to the second device 108 along with the acknowledgment. In such instances, for example, the second device 108 may transmit the acknowledgment of the pairing (420) and the connection status of the first device 106 to the remote system 110.

In some instances, data transmitted over the communication channel 128 may include an identifier or other information that indicates an intended recipient. Such identifiers may be utilized by the second device 108 to determine whether to transmit the data to the first device 106, or whether the data is intended for the second device 108. For example, when the remote system 110 transmits data to the second device 108, the second device 108 may analyze the identifier and determine whether the data is intended for the first device 106 or the second device 108. If the data is intended for the first device 106, the second device 108 may transmit the data to the first device 106 via the communication channel 128. Alternatively, if the data is intended for the second device 108, the second device 108 may output a response, for instance. Additionally, or alternatively, the remote system 110 may distinguish between data transmitted from (or originated at) the first device 106 and the second device 108. For example, when the first device 106 transmits data to the second device 108 for forwarding to the remote system 110, the remote system 110 may be able to identify that the data originated or was originally sent from the first device 106. Accordingly, the remote system 110 and/or the second device 108 may determine intended recipients and/or originators of the data for performing respective actions.

In some instances, the communication channel 128 may terminate based at least in part on the first device 106 regaining connectivity or having a threshold signal strength with the remote system 110. For example, the network analyzer component 122 of the first device 106 may attempt to monitor conditions associated with the connection to determine whether the connection is able to support the transmission of data without buffering or dropping packets (e.g., signal strength, channel quality, etc.). Upon regaining connectivity, the communication channel 128 between the first device 106 and the second device 108 may terminate. In some instances, the first device 106 and/or the second device 108 may transmit an indication to the remote system 110 of the termination of the communication channel 128 and/or that the first device 106 has regained connectivity with the remote system 110.

Additionally, while the above discussion of the process 400 is with regard to the first device 106 and the second device 108 communicatively coupling in the event of the first device 106 losing connectivity (or the connectivity falling below a threshold strength), in some instances, the first device 106 and the second device 108 may already be connected. For example, the first device 106 and the second device 108 may be communicatively coupled via Bluetooth, and upon receiving the instruction to establish the communication channel 128, the first device 106 and the second device 108 may establish a communication channel capable of transmitting larger packets of data (e.g., audio data). Here again, the second device 108 may transmit (e.g., forward) data received from the remote system 110 to the first device 106, vice versa.

Additionally, in some instances, the remote system 110 may monitor the connectivity between the first device 106 and the second device 108 using the device status component 226. For example, the device status component 226 may monitor a signal strength or a quality of connection between the first device 106 and the second device 108 to update heuristics regarding which device among the plurality of devices the remote system 110 selects for establishing the communication channel 128 with the first device 106. For example, the remote system 110 may determine what devices efficiently, effectivity, and consistency were able to communicate with the first device 106. In some instances, the first device 106 and/or the second device 108 may report (via an analysis of the network analyzer component 122 and the network analyzer component 134, respectively) the connectivity between one another (e.g., signal strength, channel quality, etc.). As an example, if the communication channel 128 between the first device 106 and the second device 108 performs poorly, the remote system 110 may record an indication of such for use in future instances when selecting a device to communicate with the first device 106. Accordingly, supervising the connection between the first device 106 and the second device 108 may train the remote system 110 when selecting devices for communicating with the first device 106.

While the process 400 is described with regard to the second device 108 connecting directly to the remote system 110 via the AP 120, in some instances, the second device 108 may utilize the network of computing devices. For example, the second device 108 may transmit received data from the first device 106 to a third device, which may then communicate the data to the remote system 110 via the AP 120. Therein, the second device 108 may receive data from the third device for forwarding to the first device 106.

Figure 5:
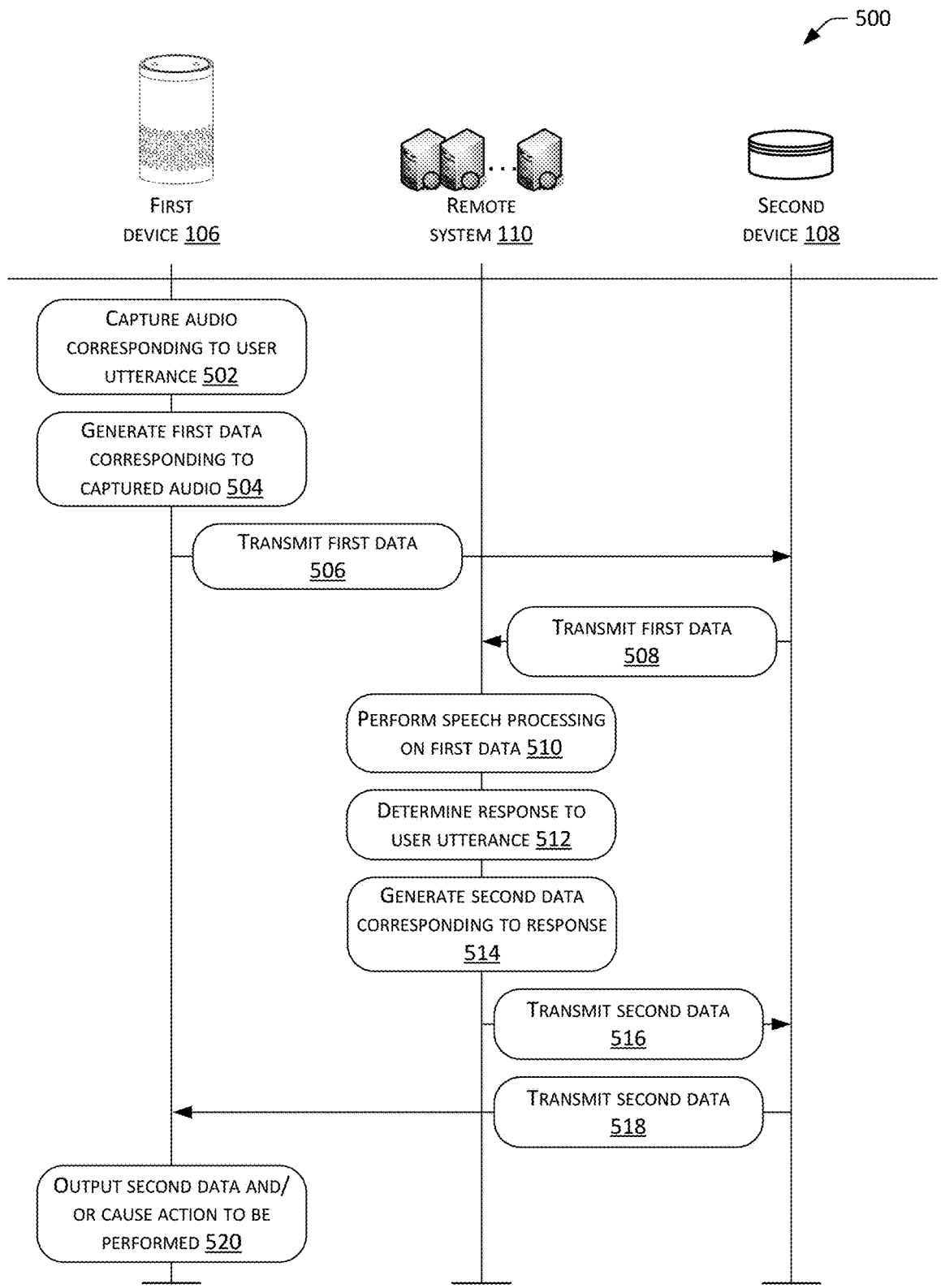
FIG. 5 illustrates an example signal diagram for sending and/or receiving data between the one or more devices of FIG. 1, using the established communication channels, according to an embodiment of the present disclosure.

FIG. 5 illustrates a process 500 for transmitting and receiving data between the first device 106, the second device 108, and the remote system 110. In some instances, the process 500 may continue from the process 400 once the communication channel 128 is established between the first device and the second device 108.

At 502, the process 500 may capture audio corresponding to a user utterance. For example, the microphone(s) 202 of the first device 106 may capture audio corresponding to the user utterance. In some instances, the user utterance may correspond to a verbal command, such as the user 104 requesting a particular song to be played. In some instances, the audio corresponding to the user utterance may be received or captured based at least in part on detecting a wake word within the user utterance.

At 504, the process 500 may generate first data corresponding to the captured audio. For example, the microphone(s) 202 of the first device 106 may generate the first data corresponding to the captured audio.

At 506, the process 500 may transmit the first data to the second device 108. For example, the first device 106 may transmit, via the communication channel 128 and the network interface(s) 116, the first data to the second device 108.

At 508, the process 500 may transmit the first data to the remote system 110. For example, based at least in part on receiving the first data from the first device 106, the second device 108 may transmit the first data to the remote system 110 for speech processing. Noted above, the first device 106 may utilize the second device 108 for communicating with the remote system 110 (or other computing devices on the network 112) given the terminated, interrupted, or latent network connectivity experienced by the first device 106.

At 510, the process 500 may perform speech processing on the first data. For example, the speech recognition component(s) 224 of the remote system 110 may process the first data to generate corresponding text data and may utilize the text data to determine an intent associated with the user utterance. For example, the speech recognition component(s) 224 may determine that the user has requested the first device 106 to play a particular song.

At 512, the process 500 may determine a response to the user utterance. For example, based at least in part on performing speech processing and/or analyzing the first data, the remote system 110 may determine a response to the user utterance. For instance, the remote system 110 may determine to play the requested song at the first device 106.

At 514, the process 500 may generate second data corresponding to the response. For example, based at least in part on determining the response, the remote system 110 may generate data corresponding to the response for output at the first device 106. Continuing with the above example, the generated second data may include a response to the verbal command, such as "Now playing your requested song." However, in some instances, the remote system 110 may not transmit the second data or other data back to the first device 106. For instance, if the user utterance is "schedule a doctor appointment for Tuesday" or "please remind me tomorrow about my doctor appointment," the remote system 110 may perform an action such as updating a calendar of the user 104, but in some instances, may not generate the second data corresponding to a response. Moreover, in some instances where the user utterance relates to outputting certain content (e.g., music) or placing a phone call, the remote system 110 may cause certain actions to be performed without generating the second data. For instance, the remote system 110 may transmit audio data associated with the song or may place a phone call on behalf of the user 104.

At 516, the process 500 may transmit the second data to the second device 108. For example, the remote system 110 may transmit the second data to the second device 108.

At 518, the process 500 may transmit the second data to the first device 106. For example, the second device 108 may transmit the second data to the first device 106 via the communication channel 128.

At 520, the process 500 may cause an action associated with the response (or the user utterance) to be performed. For example, first device 106 may play a requested song via the speaker(s) 204.

While the process 500 is described as having speech processing performed at the remote system 110, in some instances, additionally or alternatively the second device 108 may perform speech processing on the audio data. Additionally, or alternatively, the second device 108 may perform one or more actions corresponding the voice command. For example, the second device 108 may output audio or turn on one or more lights corresponding to the user utterance. In some instances, actions performed by the second device 108 may be synchronized with an output or response at the first device 106.

Further, as noted above, the first data and/or the second data may include identifiers that indicate an originator and/or an intended recipient of the data, respectively. For example, the second data may include an identifier that indicates to the second device 108 that the second data is intended for the first device 106, and accordingly, the second device 108 may transmit the second data to the first device 106.

Additionally, in the event that the connection between the first device 106 and the remote system 110 is reestablished or repaired, the first device 106 may terminate the communication channel 128 and transmit data instead over the reestablished connection.

Figure 6:
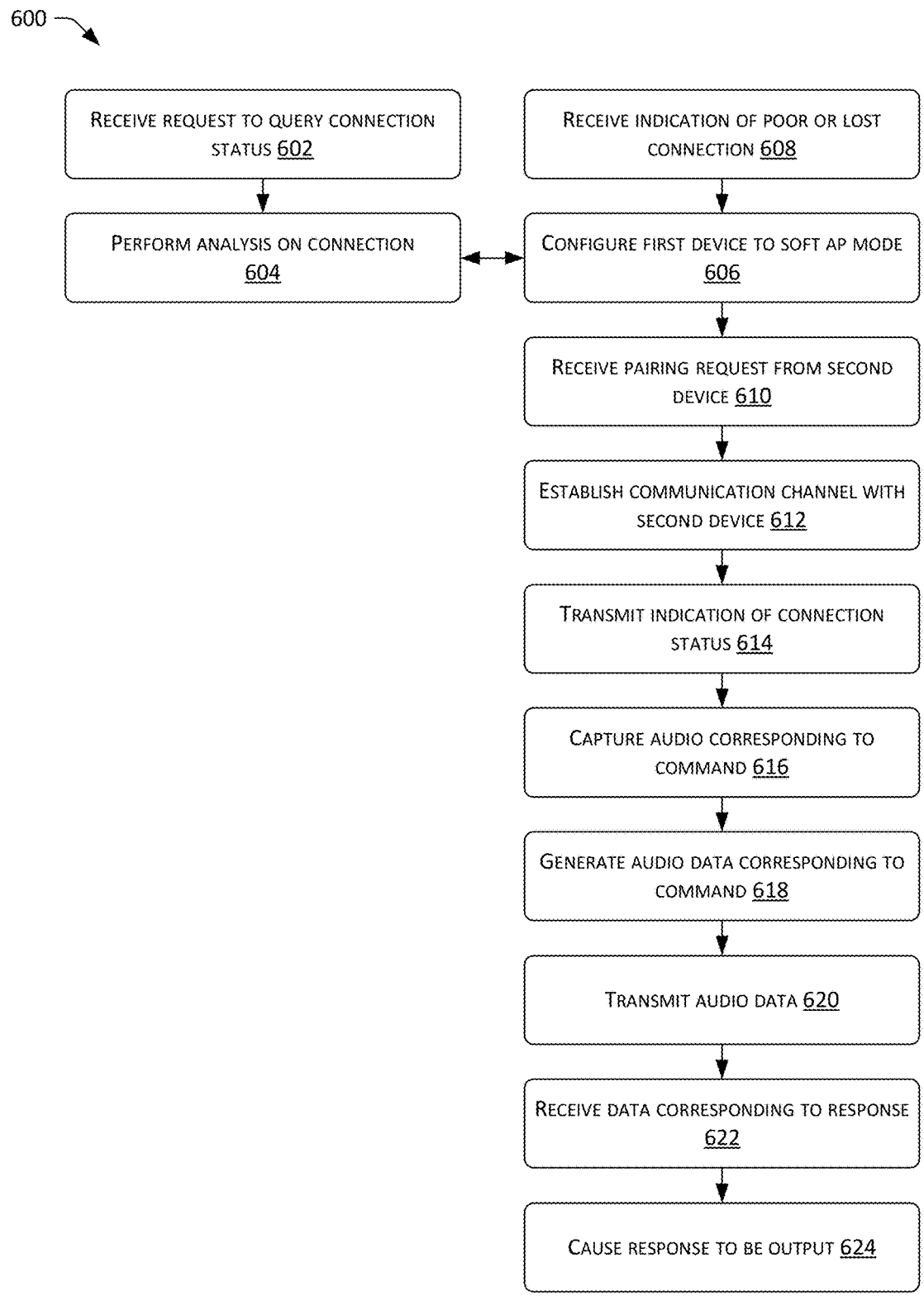
FIG. 6 illustrates an example process for analyzing network connectivity and establishing communication channels for sending and/or receiving data, according to an embodiment of the present disclosure.

FIG. 6 illustrates a process 600 for performing an analysis on a connection, establishing one or more communication channel(s) between devices, and transmitting and receiving data over the established communication channel(s). In some instances, the process 600 may be performed by the first device 106, or components of the first device 106, such as the network analyzer component 122.

At 602, the process 600 may receive a request to query a connection between the first device 106, the remote system 110, and/or the AP 120. For example, the user 104 may state a command, such as "How is my connection?" In some instances, the first device 106 may include voice processing components to locally process the command and recognize the intent. In some instances, the command may represent an explicit request by the user 104 to query or determine the connection.

At 604, the process 600 may perform an analysis on the connection. For example, the network analyzer component 122 may analyze the connection between the first device 106, the remote system 110, and/or the AP 120. In some instances, the network analyzer component 122 may perform the process 300 discussed hereinabove to analyze the connection. As a result of the analysis, and in some instances, the network analyzer component 122 may provide one or more recommendation(s) for resolving or troubleshooting issues associated with the connection (if any). From 604, the process 600 may proceed to 606.

At 606, the process 600 may configure the first device 106 to a soft AP mode. For example, the first device 106 may be configured to receive pairing requests from other devices, such as the second device 108 for purposes of connecting to the remote system 110. In some instances, the operation 606 may be performed in parallel, or substantially in parallel, with the operation 604 to reduce user perceived latency. That is, while performing the analysis at 604, the first device 106 may simultaneously or substantially simultaneously the operation 606. Stated alternatively, in some instances, the first device 106 may accept pairing requests from other devices while the network analyzer component 122 performs the connection analysis.

Additionally, the process 600 illustrates that configuring the first device 106 to the soft AP mode may be based at least in part on receiving an indication that the first device 106 is not connected to the remote system 110 and/or the AP 120 or when the connection is below a threshold strength or quality (e.g., low RSS, high PER, high SNR, etc.). For example, at 608, the first device 106, such as the network analyzer component 122, may receive an indication that the first device 106 is not connected to the AP 120 or the connection is below a threshold strength. In such instances, the process 600, from 608, may proceed to 604 and/or 606.

Regardless of whether the process 600 begins at 602 or 608, the process 600 may proceed to 610. At 610, the process 600 may receive a pairing request. For example, the first device 106 may receive the pairing request from the second device 108. In some instances, the first device 106 may be configured to receive the pairing request based at least in part on being in soft AP mode. Accordingly, in the soft AP mode, the first device 106 may receive and/or identify the pairing request from the second device 108 for purposes of establishing a communication channel.

At 612, the process 600 may establish the communication channel 128. For example, based at least in part on receiving the pairing request, the first device 106 may accept the pairing request, and in response, may establish the communication channel 128 between the first device 106 and the second device 108. In some instances, the communication channel 128 may include Bluetooth, ZigBee, or other communication protocols or technologies supportable by the first device 106 and the second device 108. In some instances, if the first device 106 and/or the second device 108 include multiple communication protocols, the first device 106 and/or the second device 108 may couple via a least congested or trafficked channel. In some instances, establishing the communication channel 128 may include the first device 106 and the second device 108 exchanging signals, data, and/or device identifiers. The first device 106 may also transmit an acknowledgment of the established communication channel 128 to the second device 108 for forwarding to the remote system 110. In some instances, based at least in part on establishing the communication channel 128, the first device 106 may refrain or strop transmitting data to the remote system 110 via the previous connection between the first device 106, the remote system 110, and/or the AP 120. Instead, the first device 106 may utilize the communication channel 128 for connecting to the remote system 110.

At 614, the process 600 may transmit a connection status. For example, the first device 106 may transmit the connection status (or an indication thereof) to the second device 108 indicating the network status of the first device 106. In some instances, the network status may be determined by the network analyzer component 122 of the first device 106, and the first device 106 may transmit this analysis, or results thereof (e.g., the recommendation(s)), to the second device 108 using the communication channel 128.

At 616, the process 600 may capture audio corresponding to a command. For example, the microphone(s) 202 of the first device 106 may capture audio corresponding to a user utterance.

At 618, the first device 106 may generate audio data corresponding to the captured audio. For example, the microphone(s) 202 may generate audio data corresponding to the captured audio.

At 620, the process 600 may transmit the audio data. For example, the first device 106 may transmit, via the communication channel 128, the audio data to the second device 108.

At 622, the process 600 may receive data corresponding to a response. For example, the first device 106 may receive, via the communication channel 128, data corresponding to the response from the second device 108.

At 624, the process 600 may cause the response to be output. For example, the first device 106 may output the response via the speakers 204 of the first device 106.

Figure 7:
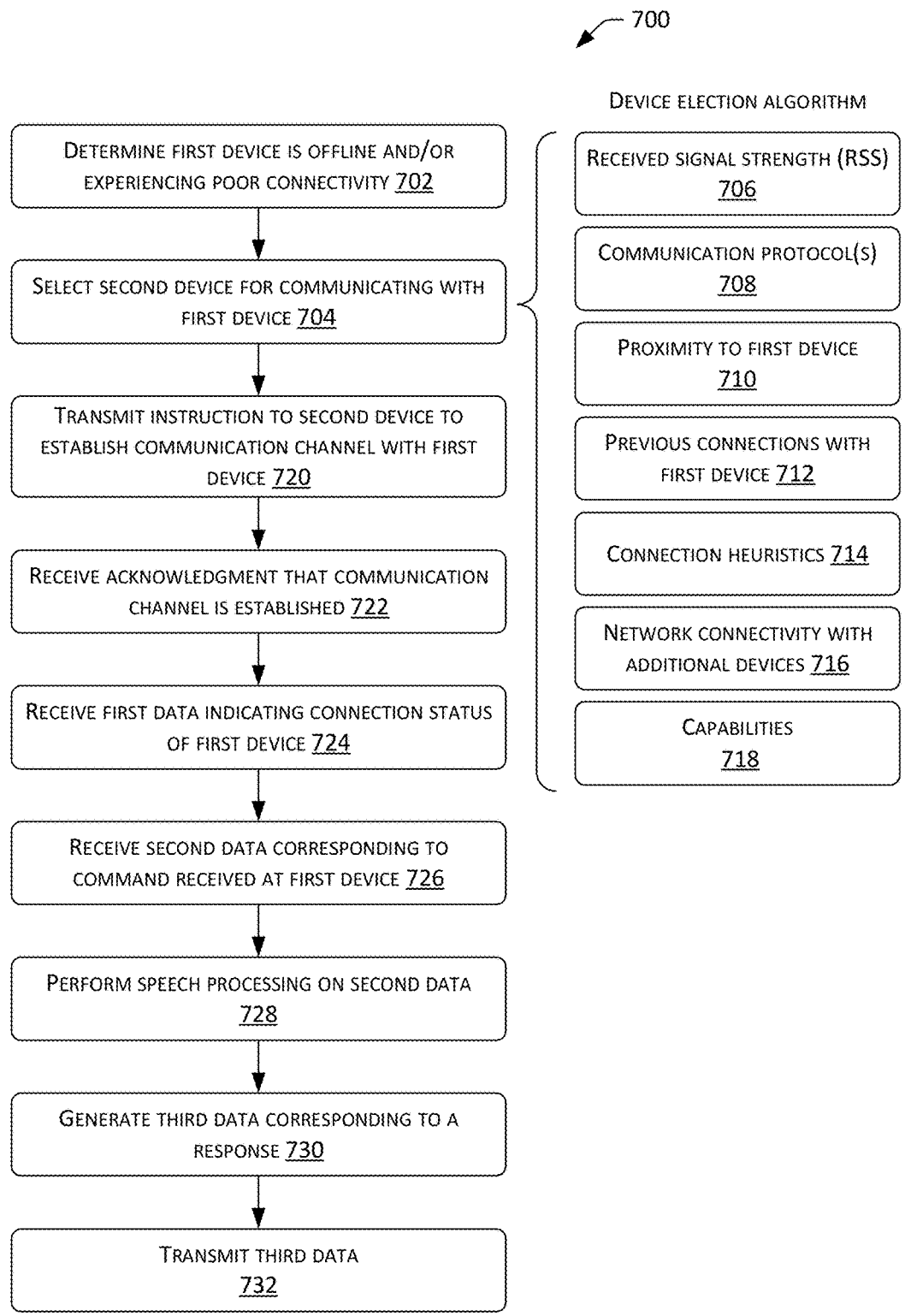
FIG. 7 illustrates an example process for establishing communication channel(s) between the one or more of devices FIG. 1, as well as sending and/or receiving data using the communication channel(s), according to an embodiment of the present disclosure.

FIG. 7 illustrates a process 700 for establishing one or more communication channel(s) between devices, and transmitting data between the device using the one or more communication channel(s). In some instances, the process 700 may be performed by the remote system 110.

At 702, the process 700 may determine that the first device 106 is offline and/or experiencing poor connectivity with the remote system 110 and/or the AP 120. For example, the device status component 226 of the remote system 110 may determine that the first device 106 is offline and/or that a connectivity between the first device 106, the remote system 110, and/or the AP 120 is below a threshold strength or quality. In some instances, the device status component 226 may determine the connectivity issues based at least in part on the remote system 110 being unable to connect with the first device 106 via the AP 120 and/or the remote system 110 being unable to transmit data (or other information) to the first device 106 (e.g., retransmission) via the AP 120. For example, the remote system 110 may be unable to transmit data to the first device 106 without the first device 106 and/or may have a RSS lower than a threshold and/or PER greater than a threshold.

At 704, the process 700 may select the second device 108 for communicating with the first device 106. For example, the device selection component 230 of the remote system may select the second device 108 for communicating with the first device 106. In some instances, the device selection component 230 may select the second device 108 among a plurality of devices within the device registry 228. As shown in FIG. 7, selecting the second device 108 may involve a device election algorithm that considers characteristics of the devices, an operational status of the devices, and/or capabilities of the devices.

For example, the device status component 226 and/or the device selection component 230 of the remote system 110 may determine a RSS 706 between each of the devices and the remote system 110 and/or the AP 120, communication protocol(s) 708 of each of the devices, a proximity 710 of each of the devices to the first device 106, previous connections 712 between each of the devices and the first device 106, connection heuristics 714 between each of the devices and the remote system 110 and/or the AP 120, network connections between each of the devices and additional devices 716, and/or capabilities 718 of each of the devices. Utilizing one or more of these criteria, the device election algorithm may determine a most suitable candidate for establishing the communication channel 128.

For example, the device election algorithm may determine the RSS between the second device 108 and the remote system 110 and/or the AP 120 (i.e., whether the second device 108 has a robust connection), the communication protocol(s) of the second device 108 (i.e., whether the second device 108 includes network interface(s) to establish the communication channel 128), a proximity of the second device 108 to the first device 106 (e.g., whether the first device 106 and the second device 108 are in the same environment), previous communications between the second device 108 and the first device 106 (i.e., whether the first device 106 and the second device 108 have historically maintained robust connections), connection heuristics of the second device 108 with the remote system 110 and/or the AP 120 (e.g., whether the second device 108 historically is able to connect to the remote system 110 via the AP 120), connections between the second device 108 and other devices (i.e., bandwidth of the second device 108), and/or capabilities of the second device 108 (e.g., whether the second device 108 may take on the increased computational load with the communication channel 128). In some instances, rather than the remote system 110 determining these characteristics, additionally, or alternatively, the remote system 110 may receive indications of the aforementioned characteristics. For example, the remote system 110 may receive, from the second device 108, an indication of the proximity to the first device 106, or the RSS and/or PER between the second device 108 and/or the AP 120.

At 720, the process 700 may transmit an instruction to the second device 108 to establish the communication channel 128. For example, the remote system 110 may transmit an instruction to the second device 108 to establish the communication channel with the first device 106. In some instances, the remote system 110 may instruct the second device 108 to establish the communication channel 128 according to capabilities of the first device 106 and the second device 108. For instance, the remote system 110 may store an indication of the communication protocols of the first device 106 and the second device 108 in the device registry 228, and may instruct the second device 108 to establish a particular communication channel or frequency band (e.g., Bluetooth, ZigBee, 2.4 GHz, 5.0 GHz, etc.). Additionally, or alternatively, as part on transmitting the instruction, the remote system 110 may also transmit the DSN, MAC address, and/or the last known IP address of the first device 106. Such information may be utilized by the second device 108 when connecting to the first device 106.

At 722, the process 700 may receive an acknowledgment that the communication channel 128 is established. For example, the remote system 110 may receive an acknowledgment from the second device 108 indicating that the second device 108 and the first device 106 are communicatively coupled via the communication channel 128.

At 724, the process 700 may receive first data indicating a connection status of the first device 106. For example, the remote system 110 may receive first data from the second device 108 that indicates a connection status of the first device 106. For example, based at least in part on the communication channel 128 being established, the first device 106 may transmit the connection status of the first device 106 to the second device 108. In some instances, the remote system 110 may utilize the connection status to provide recommendations for resolving the connection between the first device 106, the remote system 110, and/or the AP 120, and/or updating or training the device election algorithm. For example, in some instances, the second device 108 may lose connectivity with the remote system 110 and/or the AP 120, and instead, the second device 108 may utilize a connection between the first device 106 and the remote system 110 for transmitting and receiving data. The connection status of the first device 106 may therefore be used by the remote system 110 to select a master device to connect to a troubled device. For example, if the connection between the first device 106, the remote system 110, and/or the AP 120 historically has connection issues, the remote system 110 may utilize this information to select a third device (e.g., master device) for communicatively coupling the first device 106 (e.g., the troubled device) to the remote system 110. Accordingly, the remote system 110 may utilize a feedback loop and the connection status between each of the devices and the remote system 110 when selecting a master device for communicating and establishing a connection with a troubled device.

At 726, the process 700 may receive second data corresponding to a command received at the first device 106. For example, the remote system 110 may receive second data from the second device 108 corresponding to a command received at the first device 106. Discussed above, the remote system 110 may determine whether the second data was captured at the first device 106 or the second device 108 using identifier(s) for purposes of generating and/or transmitting responses or causes actions to be performed.

At 728, the process 700 may perform speech processing on the second data. For example, the speech recognition component(s) 224 of the remote system 110 may perform speech processing on the second data.

At 730, the process 700 may generate third data corresponding to a response. For example, the remote system 110 may generate third data corresponding to a response to the command after determining the intent of the command.

At 732, the process 700 may transmit the third data. For example, the remote system 110 may transmit the third data to the second device 108 for forwarding to the first device 106.

Figure 8:
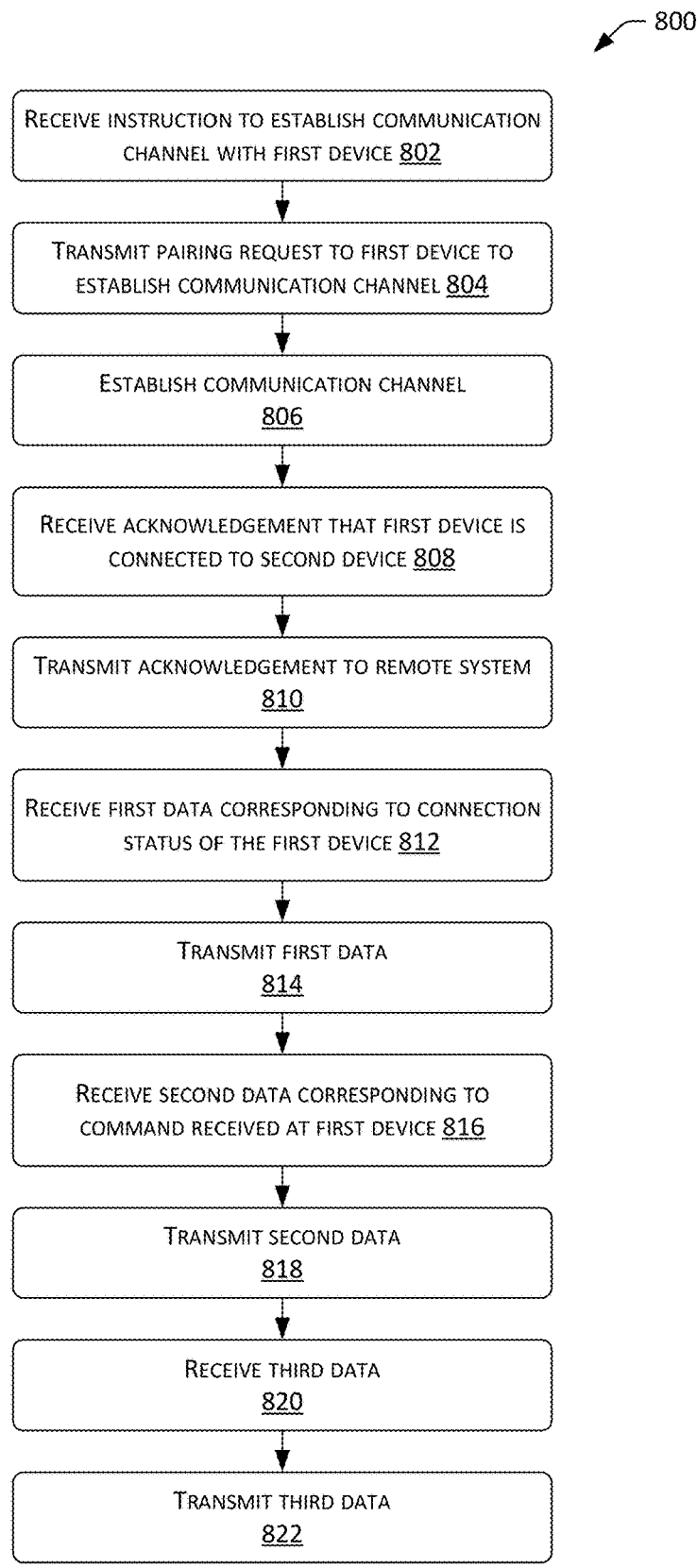
FIG. 8 illustrates an example process for establishing communication channel(s) between the one or more of devices FIG. 1, as well as sending and/or receiving data using the communication channel(s), according to an embodiment of the present disclosure.

FIG. 8 illustrates a process 800 for establishing one or more communication channel(s) between devices and transmitting data between the device using the one or more communication channel(s). In some instances, the process 800 may be performed by the second device 108.

At 802, the process 800 may receive an instruction to establish the communication channel 128 with the first device 106. For example, the second device 108 may receive an instruction to establish the communication channel 128 from the remote system 110. In some instances, the instruction may include information for establishing the communication channel 128, such as the DSN of the first device, the MAC address of the first device 106, IP address of the first device 106, and/or a communication technology to use.

At 804, the process 800 may transmit a pairing request to the first device 106 to establish the communication channel 128. For example, the second device 108 may transmit the pairing request to the first device 106 to establish the communication channel 128. The first device 106 may be configured to receive the pairing request from the second device 108 based at least in part on being in soft AP mode.

At 806, the process 800 may establish the communication channel 128. For example, the second device 108 may establish the communication channel 128 with the first device 106 based at least in part on the first device 106 accepting the pair request.

At 808, the process 800 may receive an acknowledgment that the first device 106 is connected to the second device 108. For example, the second device 108 may receive, via the communication channel 128, an acknowledgment that the first device 106 is connected to the second device 108 (or that the communication channel 128 is established).

At 810, the process 800 may transmit the acknowledgment. For example, the second device 108 may transmit the acknowledgment to the remote system 110 indicating that the first device 106 is connected to the second device 108.

At 812, the process 800 may receive first data corresponding to a connection status of the first device 106. For example, the second device 108 may receive the first data from the first device 106 via the communication channel 128.

At 814, the process 800 may transmit the first data. For example, the second device 108 may transmit the first data to the remote system 110.

At 816, the process 800 may receive second data. For example, the second device 108 may receive, from the first device 106, second data corresponding to a command received at the first device 106.

At 818, the process 800 may transmit the second data. For example, the second device 108 may transmit the second data to the remote system 110.

At 820, the process 800 may receive third data. For example, the second device 108 may receive the third data from the remote system 110, where the third data represents a response to the command.

At 822, the process 800 may transmit the third data. For example, the second device 108 may transmit the third data to the first device 106 via the communication channel 128.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A server computing device comprising:
one or more processors; and
one or more non-transitory computer-readable media storing computer-executable instructions that, when executed by the one or more processors, cause the one or more processors to perform acts comprising:
determining that a first connection between a first device and an access point (AP) has terminated;
determining a second device connected to the AP via a second connection, the second connection communicatively coupling the second device and the server computing device via the AP, wherein determining the second device is based at least in part on:
a proximity of the second device to the first device;
a communication protocol supported by the first device; and
a communication protocol supported by the second device;
transmitting, to the second device, an instruction to establish a third connection between the first device and the second device, the third connection communicatively coupling the first device to the AP via the second device, the instruction comprising:
a communication protocol to use to establish the third connection; and
an identifier of the first device;
receiving, from the second device, an acknowledgment that the third connection has been established;

receiving, from the second device, a characteristic associated with the first connection as determined by the first device, the characteristic comprising at least one of:
    an amount of time for which the first connection was terminated;
    a number of times the first device attempted to communicate with the AP via the first connection; or
    a recommendation determined by the first device to reestablish the first connection;
determining an action that, when performed, reestablishes the first connection between the first device and the AP;
causing output of data associated with the action on at least one of the first device, the second device, or a third device associated with the first device;
determining that the first connection has been reestablished; and
causing termination of the third connection based at least in part on determining that the first connection is reestablished.

2. The server computing device as recited in claim 1, wherein determining the second device is further based at least in part on at least one of:
    a signal strength of the second connection between the second device and the AP;
    a signal strength of a previous connection between the first device and the second device;
    a fourth connection between the second device and a third device; or
    a bandwidth of the second device to establish the third connection and communicate with the first device.

3. A method implemented at least in part by a server computing device, the method comprising:
    determining that a first connection between a first device in an environment and an access point (AP) in the environment has terminated;
    identifying a second device in the environment that is able to communicatively couple to the first device and the server computing device, wherein the second device is connected to the AP via a second connection;
    determining a signal strength of the second connection between the second device and the AP;
    sending, to the second device and based at least in part on the signal strength of the second connection, a request to establish a third connection between the second device and the first device, the request including an identifier of the first device and a communication protocol for the second device to use when establishing the third connection, the third connection communicatively coupling the first device and the server computing device via the second device; and
    receiving, from the second device, data indicating one or more characteristics associated with the first connection.

4. The method as recited in claim 3, wherein the one or more characteristics comprise at least one of:
    a communication protocol utilized by the first device to communicate with the server computing device via the first connection;
    an amount of time for which the first connection was terminated;
    a number of attempts made by the first device to reestablish the first connection; or
    a packet error rate associated with data transmission between the first device and the server computing device via the first connection.

5. The method as recited in claim 3, further comprising:
determining, based at least in part on the one or more characteristics, a recommended action for reestablishing the first connection; and
causing output of the recommended action on at least one of:
    the first device;
    the second device; or
    a third device associated with the first device.

6. The method as recited in claim 3, wherein the first device is configured to establish the third connection based at least in part on at least one of:
    the first connection being terminated; or
    configuring one or more network interfaces of the first device to accept an instruction from the second device to establish the third connection.

7. The method as recited in claim 3, further comprising determining at least one of:
    a proximity of the second device to the first device within the environment;
    a communication protocol supported by the first device; or
    a communication protocol supported by the second device, and
wherein sending the request to the second device is based at least in part on at least one of:
    the proximity of the second device to the first device;
    the communication protocol of the first device; or
    the communication protocol of the second device.

8. The method as recited in claim 3, wherein the one or more characteristics comprise one or more first characteristics, the method further comprising:
    determining, for the second device, one or more second characteristics comprising at least one of:
        a proximity of the second device to the first device within the environment;
        a communication protocol supported by the second device;
        a previous connection between the first device and the second device;
        a current connection between the second device and a fourth device; or
        a bandwidth of the second device to establish the third connection; and
    determining, for a third device, one or more third characteristics comprising at least of one:
        a proximity of the third device to the first device within the environment;
        a communication protocol supported by the third device;
        a previous connection between the third device and the first device;
        a connection between the server computing device and the third device;
        a current connection between the third device and the fourth device; or
        a bandwidth of the third device to establish the third connection, and
    selecting, based at least in part on the one or more second characteristics and the one or more third characteristics, the second device for establishing the third connection with the first device.

9. The method as recited in claim 3, wherein the request comprises a first request, the method further comprising:

receiving, from the second device, one or more characteristics associated with the third connection, the one or more characteristics associated with the third connection comprising at least one of:
a signal strength of the third connection;
a packer error rate value associated with the second device transmitting data to the first device via the third connection; or
a received signal strength indicator value associated with the second device receiving data from the first device via the third connection; and
sending, to a third device, a second request to establish a fourth connection between the third device and the first device, the fourth connection communicatively coupling the first device and the server computing device via the third device.

10. The method as recited in claim 3, wherein the request further comprises at least one of:
an internet protocol address of the first device;
a media access control address of the first device; or
a device location service of the first device.

11. The method as recited in claim 3, further comprising:
determining that the first connection between the first device and the server computing device has been reestablished; and
causing the third connection to terminate.

12. The method as recited in claim 3, wherein determining that the first connection has been terminated and sending the request to the second device occur substantially simultaneously.

13. A first device comprising:
at least one processor; and
one or more non-transitory computer-readable media storing computer-executable instructions that, when executed by the at least one processor, cause the at least one processor to perform acts comprising:
determining that a first connection between the first device and an access point (AP) has terminated, wherein prior to the first connection terminating, the first device was communicatively coupled to a server computing device via the AP;
based at least in part on determining that the first connection has terminated, activating a pairing mode of the first device, wherein the pairing mode permits the first device to receive a pairing request from a second device that is communicatively coupled to the server computing device via the AP;
receiving the pairing request from the second device;
establishing a second connection with the second device, the second connection communicatively coupling the first device to the server computing device via the second device; and
sending data related to the first connection to the server computing device via the second device.

14. The first device as recited in claim 13, wherein the data related to the first connection comprises at least one of:
a communication protocol utilized by the first device to communicate via the first connection with AP;
an amount of time for which the first connection was terminated;
a number of attempts made by the first device to reestablish the first connection; or
a previous packet error rate associated with data transmission between first device the server computing device via the first connection.

15. The first device as recited in claim 13, wherein the one or more non-transitory computer-readable media store computer-executable instructions that, when executed by the at least one processor, cause the at least one processor to further perform an act comprising determining an action for reestablishing the first connection, wherein the action comprises at least one of:
repositioning the first device within an environment in which the first device resides;
switching a communication protocol of the first device used to communicate via the first connection with the AP; or
switching a frequency band associated with the communication protocol.

16. The first device as recited in claim 13, wherein the one or more non-transitory computer-readable media store computer-executable instructions that, when executed by the at least one processor, cause the at least one processor to further perform acts comprising:
determining that the first connection between the first device and the AP has been reestablished; and
causing the second connection to terminate.

17. The first device as recited in claim 13, wherein the one or more non-transitory computer-readable media store computer-executable instructions that, when executed by the at least one processor, cause the at least one processor to further perform an act comprising receiving, from the second device via the second connection, an action for reestablishing the first connection.

18. The first device as recited in claim 17, wherein the one or more non-transitory computer-readable media store computer-executable instructions that, when executed by the at least one processor, cause the at least one processor to further perform acts comprising:
determining a recommendation for reestablishing the first connection; and
causing data associated with the recommendation to be output on at least one of the first device, the second device, or a third device associated with the first device, and
wherein the first device, the second device, or the third device is configured to perform an action based at least in part on the recommendation.

19. The first device as recited in claim 13, wherein determining that the first connection between the first device and AP has terminated and receiving the pairing request from the second device occur substantially simultaneously.

20. The first device as recited in claim 13, wherein the first device further comprises one or more microphones, and wherein the one or more non-transitory computer-readable media store computer-executable instructions that, when executed by the at least one processor, cause the at least one processor to further perform an act comprising receiving, via the one or more microphones, audio data corresponding to a voice command requesting a status of the first connection, and
wherein determining that the first connection between the first device and the AP has terminated is based at least in part on receiving the audio data.

* * * * *